United States Patent
Nielsen et al.

(10) Patent No.: US 9,003,141 B2
(45) Date of Patent: Apr. 7, 2015

(54) ENHANCED SOFTWARE APPLICATION PLATFORM

(71) Applicants: Eric H. Nielsen, Santa Cruz, CA (US); Alex B. Blate, San Jose, CA (US)

(72) Inventors: Eric H. Nielsen, Santa Cruz, CA (US); Alex B. Blate, San Jose, CA (US)

(73) Assignee: CA, Inc., New York, NY (US)

( * ) Notice: Subject to any disclaimer, the term of this patent is extended or adjusted under 35 U.S.C. 154(b) by 227 days.

(21) Appl. No.: 13/676,090

(22) Filed: Nov. 13, 2012

(65) Prior Publication Data

US 2013/0124807 A1    May 16, 2013

Related U.S. Application Data

(60) Provisional application No. 61/559,631, filed on Nov. 14, 2011.

(51) Int. Cl.
| | |
|---|---|
| *G06F 12/02* | (2006.01) |
| *G06F 9/50* | (2006.01) |
| *G06F 11/14* | (2006.01) |
| *G06F 11/20* | (2006.01) |

(52) U.S. Cl.
CPC .......... *G06F 9/5077* (2013.01); *G06F 11/1438* (2013.01); *G06F 11/1482* (2013.01); *G06F 11/20* (2013.01)

(58) Field of Classification Search
CPC ..... G06F 9/54; G06F 3/0665; G06F 9/45558; G06F 11/2069; G06F 3/0632; G06F 11/1456; G06F 11/1458; G06F 11/1464; G06F 2201/84; G06F 11/0712; G06F 11/1484; G06F 12/109; G06F 11/1482; G06F 9/00; G06F 9/45504; G06F 9/45533; G06F 9/5077; G06F 11/1451; G06F 11/1469; G06F 2201/815; G06F 11/1438; G06F 11/20; G06F 3/06
USPC ............................................... 711/162; 718/1
See application file for complete search history.

(56) References Cited

U.S. PATENT DOCUMENTS

| | | | |
|---|---|---|---|
| 8,700,867 B2 * | 4/2014 | Chen .............................. | 711/154 |
| 2008/0189468 A1 * | 8/2008 | Schmidt et al. ................... | 711/6 |
| 2011/0153697 A1 * | 6/2011 | Nickolov et al. ............. | 707/827 |

* cited by examiner

*Primary Examiner* — Hashem Farrokh
(74) *Attorney, Agent, or Firm* — Baker Botts L.L.P.

(57) ABSTRACT

A system includes information for generating a first appliance based on first appliance information, information for generating a second appliance based on second appliance information, and information for configuring communication between the first appliance and the second appliance. The system further includes at least one processor configured to generate a first volume by copying the first appliance information using a first set of parameters associated with an environment in which the first volume is situated, and generate a second volume by copying the second appliance information using a second set of parameters associated with an environment in which the second volume is situated. The system also includes at least one processor configured to initiate a first appliance instance by executing code from the first volume using information in the third volume, and initiate a second appliance instance by executing code in the second volume using information in a fourth volume.

21 Claims, 9 Drawing Sheets

ENHANCED SOFTWARE APPLICATION PLATFORM

RELATED APPLICATIONS

This application claims priority to U.S. Provisional Patent Application Ser. No. 61/559,631, entitled Enhanced Software Application Platform, and filed on Nov. 14, 2011, which is hereby incorporated by reference.

BACKGROUND

The present disclosure relates generally to network-based applications, and more specifically, to an enhanced software application platform. Applications or services are increasingly being provided using networks. For example, applications have been delivered as a service in Software-as-a-Service (SaaS) architectures. Problems have arisen in this area. For example, provisioning and/or upgrading such applications is labor intensive. As another example, access to items such as log files and audit information is difficult. As yet another example, using more than one application that is delivered using networks as described above has many seams that may hinder productivity and integration. As yet another example, multiple applications may require multiple authentications.

BRIEF SUMMARY

According to particular embodiments of the present disclosure, a system includes information for generating a first appliance based on first appliance information, information for generating a second appliance based on second appliance information, and information for configuring communication between the first appliance and the second appliance. The system further includes at least one processor configured to generate a first volume by copying the first appliance information using a first set of parameters associated with an environment in which the first volume is situated, and generate a second volume by copying the second appliance information using a second set of parameters associated with an environment in which the second volume is situated. The system also includes at least one processor configured to initiate a first appliance instance by executing code from the first volume using information in the third volume, and initiate a second appliance instance by executing code in the second volume using information in a fourth volume.

According to particular embodiments of the present disclosure, the system further includes information for generating a third appliance based on the third appliance information, and information for configuring communication between the first appliance and the third appliance. The system also includes at least one processor is further configured to generate a fifth volume by copying the first appliance information into the fifth volume using a third set of parameters associated with an environment in which the fifth volume is situated, and generate a sixth volume by copying the third appliance information into the sixth volume using a fourth set of parameters associated with an environment in which the sixth volume is situated. The at least one processor is further configured to initiate a third appliance instance by executing code from the fifth volume using information in the seventh volume, and initiate a fourth appliance instance by executing code in the fifth volume using information in the eighth volume.

According to particular embodiments of the present disclosure, a method includes accessing application information comprising: information for generating a first appliance based on first appliance information; information for generating a second appliance based on second appliance information different from the first appliance information; information for configuring communication between the first appliance and the second appliance; a first identifier associated with a third volume; and a second identifier associated with a fourth volume. The method further includes generating a first volume using the application information and a first set of parameters associated with an environment in which the first volume is situated, and generating a second volume using the second application information and a second set of parameters associated with an environment in which the second volume is situated. The method also includes initiating a first appliance instance by executing code from the first volume using information in the third volume, and initiating a second appliance instance by executing code in the second volume using information in a fourth volume.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
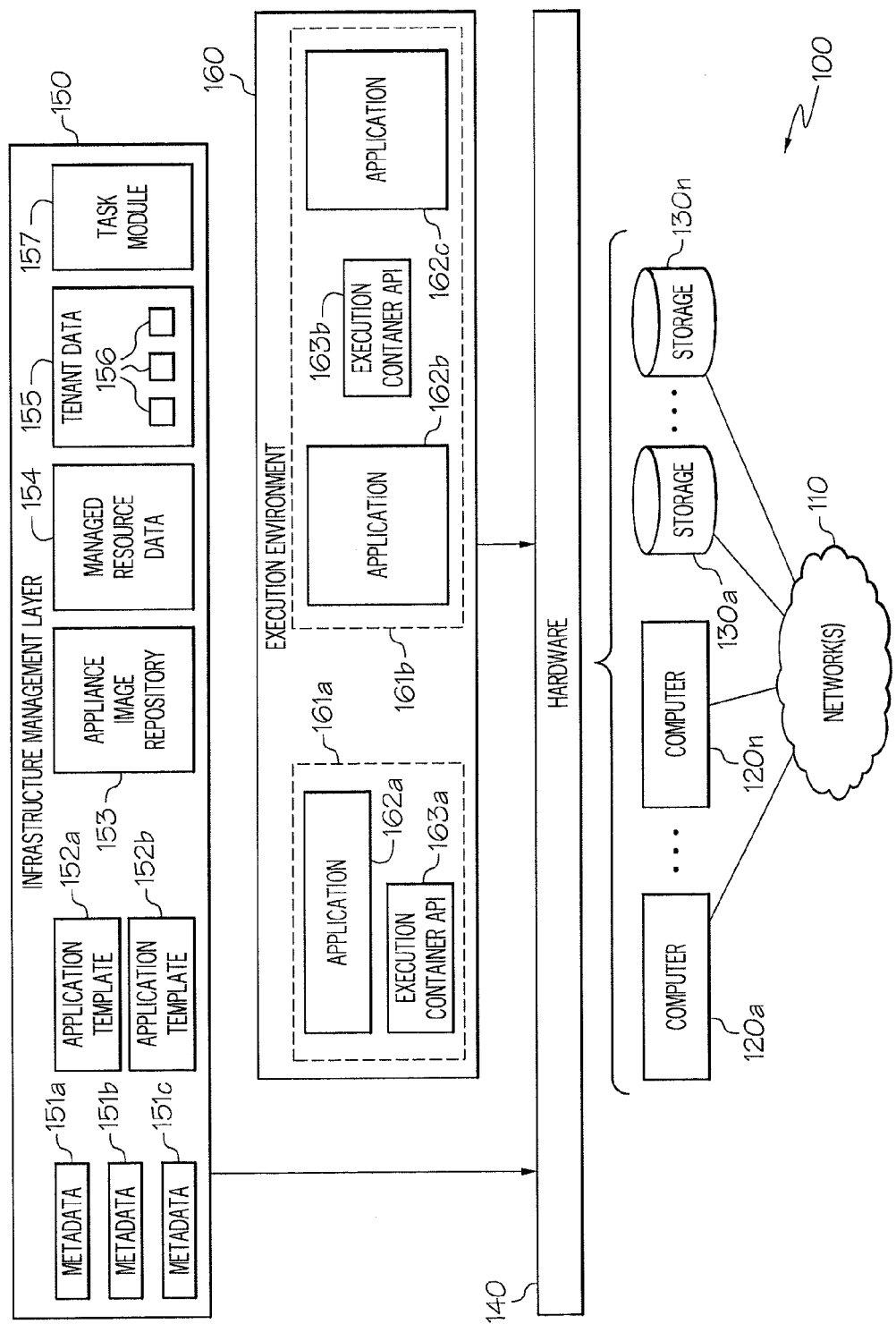
FIG. 1 illustrates one embodiment of a software as a service (SaaS) system and an infrastructure management layer.

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented as entirely hardware, entirely software (including firmware, resident software, micro-code, or other suitable types of software) or combining software and hardware implementation that may all generally be referred to herein as a "circuit," "module," "component," or "system." Furthermore, aspects of the present disclosure may take the form of a computer program product embodied in one or more computer readable media (e.g., tangible, non-transitory computer readable media) having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

FIG. 1 illustrates a software as a service (SaaS) system 100 that includes network 110, computer systems 120, storage 130 (collectively, hardware 140). Running on hardware 140 is an infrastructure management layer 150 that may comprise metadata 151, application templates 152, an appliance image repository 153, managed resource data 154, tenant application contexts 156, and task module 157. In particular embodiments, infrastructure management layer 150 may be operable to run and support an execution environment 160, which may include one or more execution containers 161 in which one or more application instances 162 may run. Application instances 162 may be comprised of appliance instances generated from appliance images located in appliance image repository 153. An application instance 162 may be generated based on certain metadata 151 and an application template 152, which may identify the one or more appliance images that comprise the application instance 162. In some embodiments, execution containers 161 may include an execution container application programming interface (API) 163 which may be used by infrastructure management layer 150 to communicate with and control execution containers 161 and application instances 162 running thereon.

SaaS system 100 may allow the separation and independence of an application's operational and functional lifecycles. Thus, integrations of applications are made independent. Each application may be accompanied by sufficient descriptive information (e.g., metadata) such that an infrastructure management layer can create instances of the application, expose information about it, and manage its lifecycle. One aspect of the present disclosure is that all such applications may conform to and implement a common set of standards specifying the means and semantics for their interaction and communication with the infrastructure management machine and/or other applications. The infrastructure management machine, then, requires no knowledge of the internal details of applications and manages them all in a standard, uniform way.

In this way, users of one or more applications are unaware of the physical location of the underlying machines/instances and may interact with applications via the provided logical connections and standardized protocols and semantics. As a consequence of this mechanism, applications interact opaquely and, moreover, securely, in that they cannot directly-address one another. Integrations between applications, then, are unable to become dependent on the details or implementation of the underlying infrastructure or even other applications.

The explicit separation of operational protocols, interfaces, and semantics from application-functional protocols, interfaces, and semantics, then, decouples operational and application-functional lifecycles. For example, a constant version of the operational components can support rapidly-evolving versions of applications. In particular embodiments, all tier 1 operational communication is via a standardized, uniform protocol and semantics. The protocol standardizes object type and base attribute semantics, and uses metadata to describe their behavior and values. This provides a significant degree of version resilience to the system since all applications will never upgrade synchronously. Additional version resilience and loose-coupling is achieved by programming elements to be more metadata aware, using metadata to discover what can be communicated.

The infrastructure management layer, in some embodiments may be unaware of the functional interactions/integrations between applications and users—it is responsible only for enabling the execution of the applications, their management, and facilitating logical connections to them. Changes to application behavior, implementation, interaction, and/or integration are opaque to it. Management and operational integration is invariant to the underlying integrations or solutions.

The disclosed mechanism, then, decouples functional integration from operational integration, permitting each application instance to have its own set of lifecycles independently from the other. Operational functions are robust to changes in applications, including versioning, and applications are robust to changes in operational machinery, including versioning. This independence eliminates a large equivalence class of (often-)cyclic dependencies that emerge in integrated systems—such as the typically-slower operational lifecycle holding back functional/application-level changes.

The disclosed mechanism also enables functional application decoupling. Each application's tightly coupled functionality is encapsulated in a single operational unit. By convention, loosely-coupled components are encapsulated separately. The disclosed mechanism may use metadata to implement loose coupling among applications' at the user functionality level which is much more version-change resilient than with standard interfaces used by Java or SOAP. Some embodiments may use the OData standard to implement RESTful interfaces with metadata to define the objects, attributes and describe their values and behaviors for every interface If encapsulation is complete, e.g., application integration is only through standard OData interfaces, then operational upgrades can be independent of integration-induced coupling.

In some embodiments, a virtual machine manager may run a virtual machine environment on shared hardware 140, and may embody aspects of the present disclosure. In such embodiments, system 100 may utilize hardware virtualization techniques to run one or more virtual machines inside one or more virtual machine environments that are controlled by one or more virtual machine managers. Hardware virtualization may refer to the abstraction of computer hardware resources, allowing for the sharing of the underlying resources between the one or more virtual machines. A virtual machine manager may refer to virtualization software operable to manage and/or control the execution of one or more virtual machines. In some embodiments, virtual machine manager may refer to a bare-metal or native-type hypervisor running directly on shared hardware 140 to control the hardware 140 and manage the virtual machines running thereon. In other embodiments, virtual machine manager may refer to a hosted-type hypervisor running within a conventional operating system environment. Examples of virtual machine manager software include VMware vSphere, VMware ESXi, Citrix XenServer, and Microsoft Hyper-V. In other embodiments, virtual machine manager may refer to a purely software-based virtual machine or byte-code interpreter, such as a Java Virtual Machine or .NET or in an application container framework, such as OSGI containers. In certain embodiments, the virtual machine manager may run on a plurality of computer systems 120 in shared hardware 140. In other embodiments, the virtual machine manager may run on a single computer system 120 in shared hardware 140.

In embodiments with virtualization, the virtual machine manager may be operable to create and control a virtual machine environment. The virtual machine environment may be operable to run one or more virtual machines. A virtual machine may refer to the software implementation of a physical machine, wherein the virtual machine may provide computer functionality. Thus, a virtual machine may provide an environment that emulates a physical computer platform, and may execute an operating system and/or one or more software programs or modules. For example, a virtual machine may run operating systems such as Microsoft Windows, Linux, and Mac OS. Furthermore, a virtual machine may run one or more software applications and/or other logic that may be encoded in one or more tangible computer-readable media and may perform operations when executed by a processor.

Infrastructure management layer 150 of system 100 may communicate with the one or more application instances 162 through one or more interfaces associated with the application instance. For instance, the application instance 162 may "expose" one or more interfaces to infrastructure management layer 150 through an application API. In particular embodiments, the APIs exposed by application instances 162 to infrastructure management layer 150 may conform to a uniform format, and may include a particular set of APIs that are common to all applications. Through these APIs, infrastructure management layer 150 may communicate with application instances 162 similar to objects in object-oriented programming. In other words, application instances 162 may essentially be "black boxes" with the interfaces being the only way for infrastructure management layer 150 to communicate with them.

To improve the version resilience of these interfaces, particular embodiments may include interfaces defined in terms of RESTful semantics (POST, PUT, DELETE, GET) where the object's attributes are fully described using metadata. This may require that both ends of each communication agree on the object naming and metadata semantics as well as the REST protocol and from that make assumptions that there is agreement on functional semantics. In certain embodiments, the OData protocol may be used.

Infrastructure management layer 150 may be operable to facilitate the entire lifecycle (i.e., the creation, management, and destruction) of applications 162. For instance, infrastructure management layer 150 may be operable to instantiate application instances 162 in execution environment 160 based on metadata 151 and an application templates 152. Once instantiated in execution environment 160, certain details of applications 162 may be stored in managed resource data 154. In addition, certain resource allocation requests made by system administrators may be handled by infrastructure management layer 150. These requests may be stored and/or managed through task module 157. In performing this role, infrastructure management layer 150 may become the source of record for almost all information related to that tenant's resource assignments for each provisioned capability. This information may be stored at tenant data 155.

Sometimes, requests to infrastructure management layer 150 and the actions performed on their behalf may often take a long period of time to complete, such as in the case where a new application instance 162 must be created on which to home the tenant. It is also possible that infrastructure management layer 150 may be too busy to immediately fulfill a given request or that certain resources are not yet available. Therefore, in some embodiments, the interaction model for resource allocation, de-allocation, and related operations performed by infrastructure management layer 150 may be asynchronous.

In some embodiments, tenants for application instances may be created and managed by some external management service. As one example, this function may be managed by a Liferay or other Portlet Container component running on hardware 140 (not shown). Organizations, tenants, and users in such embodiments are all created and managed by this external service. Infrastructure management layer 150 would therefore be concerned solely with tenants and capabilities, which are identified by a globally-unique identifier (UUID), preferably accompanied by a human-readable display name. When infrastructure management layer 150 becomes aware of a new tenant-capability mapping, it creates a first-class object called a Tenant Application Context (TAC) 156. A TAC 156 becomes the container, so-to-speak, for all information relating to that capability for that tenant. TACs 156 may be stored in tenant data 155 on infrastructure management layer 150.

Requests submitted to infrastructure management layer 150 may be in connection with some end-user (administrator) transaction. They also may be part of a larger set of transactions, such as, for example, provisioning three new capabilities for a tenant. In such embodiments, infrastructure management layer 150 may guarantee that once it has accepted a request that it will eventually complete the request or provide the client with notification of its failure. Some implications of this may include: a) the task module may require a durable backing store, b) tasks may never deleted until they have completed and such completion is acknowledged by the client or some very long timeout expires, c) workers may logically acquire tasks (by atomically acquiring a task and marking it as being processed), and as such, workers may need to periodically update their status (e.g., a timestamp on the task), and d) if a task claims to be in progress but has not been updated within a defined time interval, it may be deemed that the given instance (e.g., application instance 162*b*) failed and the task may then either be taken up by another instance (e.g., application instance 162*c*), marked for a cleanup operation, or, as applicable, moved into a failed status.

Sometimes, certain types of requests may have precedence over others. In such cases, task module 157 may implement a priority system, such as a set of parallel queues, each with its own scheduling semantics. Sometimes, other scheduling disciplines or algorithms may be used to select the order in which tasks are processed. In some embodiments, it may be possible to administratively "pause" the task module—i.e., prevent further tasks from being serviced—so that the system can be quiesced, e.g., for maintenance activities. In addition, in some embodiments, infrastructure management layer 150 may provide an interface for clients to query the task module, for example, to determine the existence of tasks related to a tenant. As appropriate, infrastructure management layer 150 may also allow clients to abort or cancel tasks presuming that such cancellation can be done cleanly and safely.

Execution environment 160 may be considered, in some embodiments, to be the union of instances of common components and provisioned components constituting, in part or in whole, a particular SaaS deployment. In certain embodiments, each execution environment 160 has exactly one infrastructure management layer 150 instance associated therewith. Infrastructure management layer 150 may have access to and credentials for the execution container API on each execution container 161.

Each execution container may be the authoritative source of record for any execution container specific objects, such as application instances or data volumes, to which the execution container 161 assigns a UUID. Examples of execution containers may include the CA APPLOGIC grid controller and VMWARE VSPHERE. Infrastructure management layer 150 fetches and monitors available resources (e.g., CPU, memory, network bandwidth, disk consumption) for each of its execution container 161. Such information is fetched dynamically via execution container API 163 and may be stored in managed resource data 154. Examples of execution container API 163 include the API exposed by a hypervisor such as VMWARE ESX or ESXi. Infrastructure management layer 150 may make resource allocation decisions, in part, based on available execution container resources. In some embodiments, each execution container may be the authoritative source of record for, inter alia, present application and component state, volume storage locations, appliance catalog contents, master volume images, actual available resources (as opposed to unreserved resources), and execution container status. Infrastructure management layer 150 may associate other attributes with execution containers, such as an execution container with special properties (e.g., high-performance I/O, or low-availability SLAs). In some embodiments, these properties may be used to make resource allocation decisions, for example, in deciding which execution container a given application instance should be instantiated.

In particular embodiments, components may be assigned network addresses. Network addresses may include IP addresses (including version 4 (IPv4) addresses and/or version 6 (IPv6) addresses) or any other suitable addresses based on network layer (Layer 3) protocols. Infrastructure management layer 150, in particular embodiments, may assign IP addresses to application instances 162. These IP addresses are required to be from networks of specific types and execution container association. The set of addresses of a specific type for a specific execution container may be referred to as a "pool" of addresses. A network in execution environment 160 may be uniquely identified by its UUID and by its network address, subnet mask, and execution container ID. In some embodiments, execution environment 160 may include one or more DNS servers and/or default gateways. In particular embodiments, each network may also have a property specifying which, if any, VLAN must be used. Networks may be added and managed as an administrative function of infrastructure management layer 150.

The IP addresses assigned by infrastructure management layer 150 may be associated with exactly one network, and an IP address may be uniquely identified by its UUID and by the combination of its host address and network UUID. Note that in some embodiments, the same Host Address (e.g., 192.168.55.24) may exist in multiple networks (such as if infrastructure management layer 150 manages execution containers in multiple data centers). Thus, the network UUID may be required for uniqueness in some embodiments. Further, each IP address may be associated with zero or one application instance; this relation is by UUID and may be stored at infrastructure management layer 150 for both the application instance 162 and the IP address. Once provisioned in infrastructure management layer 150, the IP addresses in a given network are managed by infrastructure management layer 150 and may not be used for other purposes. Infrastructure management layer 150 then becomes the authoritative source of record for IP address availability, assignment, or any other suitable network address information, and stores this information in managed resource data 154. In particular embodiments, infrastructure management layer 150 thus assumes responsibility for managing the IP address spaces assigned to it including, inter alia, the prevention of duplicate IP address assignments.

Management of application instances 162 management may also be handled by infrastructure management layer 150. Moreover, infrastructure management layer 150 may be the authoritative source of record for the set of application instances 162 available in its execution environment 160, as well as all associated metadata 151. Infrastructure management layer 150 may create application instance 162 on-demand based on tenant provisioning requests or administrative requests. In one embodiment, application instances 162 are created only when a request for a capability for a new tenant is received and, based on capacity and other factors, that tenant cannot be provisioned on an existing application instance 162.

To create an instance, infrastructure management layer 150 may combine metadata 151 associated with an application with an application template 152. Metadata 151 may refer to all of the requisite information to instantiate, configure, operate, and manage an application and its lifecycle in a completely data-driven manner. In this way, metadata 151 may define the generic executable portion of an application instance. Metadata 151 may be stored in a single object at infrastructure management layer 150. This object may be the complete set of information needed to create and use an instance of an application. Metadata 151 may be expressed in any suitable computer-readable data format, and may include, for example, an XML or JSON document. In particular embodiments, metadata is expressed in a format that is both human- and machine-readable. Examples of metadata include, for example, machine/capability identifiers; version identifiers; human-readable descriptions or other text; the source of the generic executable portion of the machine; instance-specific configuration parameters; requisite resource assignments, such as network addresses, license keys, host names, credentials and/or key material; definitions of all network, communications interfaces, or other services exposed by the machine and how to access them; capacity/nameplate ratings; resource requirements (e.g., disk space, memory, CPU, power); performance, capacity, and other metrics exposed by the machine; descriptions of the machine's ability to perform backup and restore operations of various sorts; regulatory/compliance standards implemented or that can be activated in the machine; the types of high-availability, fault tolerance, et seq. mechanisms supported by the machine; machine-specific requirements for provisioning top-level objects/object owners/data partitions (e.g., tenants); information regarding the machine's support of one or more authorization and/or role management schemes; the machine's ability to be upgraded and, as applicable, what prior (upgrade-from) versions are supported; digital signatures, checksums, or other suitable cryptographic data used to establish integrity, origin, and authenticity of an instance of the machine and/or the metadata itself.

An example of metadata is shown below:

```
#Comments denoted with '#'
#Application descriptor consumed by Infrastructure Management Server
{
    "descriptor_id": "60dcfcf7-da50-449d-8bdd-47342019e118",
    "display_name": "Wall Collaboration Service",
    "template_name": "Gridified_wall_template",
    "capability_id": "7cda4aeb-2b3a-4e37-b090-56c417d71833",
    "capability_cname": "WALL",
    "version_id": "7b308867-19ae-424f-a454-f5dca55a0c3c",
    "version_name":"1.0",
    "instance_suffix":"wall",
    "profile_id": "68faf113-f456-4177-8160-ea377640b3b0",
    "profile_name":"DEFAULT",
    "aim_adproperties": [
            { "name" : "AppIPAddress" , "type" : "IP", "network":
                "DMZ" },
            { "name" : "MgtIPAddress" , "type" : "IP", "network": "MGT" },
            { "name" : "AppOutIPAddress" , "type" :"IP", "network" :"DMZ"},
            { "name" : "Environment" , "type" : "ENVIRONMENT_NAME" },
            { "name" : "SoftwareVersion", "type" : "SOFTWARE_VERSION"},
            { "name" : "DomainSuffix", "type" : "DOMAIN_SUFFIX"}
    ],
    "volumes" :[
         { "name" :"mon" , "type" : "SYS_DATA", "size" : "1024", "units":
"MB", "format" : "ext3", "backup" : false},
         {"name" : "log" , "type" : "SYS_DATA", "size" : "1024", "units":
"MB","format" : "ext3", "backup" : false },
         { "name" : "mysql_data_1", "type" : "USER_DATA", "size" :
"1024","units": "MB", "format": "raw", "backup": true}
    ],
    "resources" :[
         { "name": "cpu", "type" : "CPU", "units" : "CORES", "value": "2" },
         { "name": "mem", "type" : "MEMORY", "units": "MB", "value":
"2048"},
         { "name": "bw", "type" : "NET_BANDWIDTH", "units": "Mbps",
"value": "100" }
    ],
    "application_capacities" :[
            {"name": "Users" ,"value": "1000000","metric_type":
            "NUM_USERS"},
                {"name": "Tenants" ,"value":
"100000","metric_type":"NUM_TENANTS"}
    ],
    "ip_services" :[
            {"name": "app_access", "type":
"APP_ACCESS","port":"8080","protocol":"http","ip" :"AppIPAddress"},
            {"name": "log_access" ,"type":
"LOG_ACCESS","port":"8080","protocol":"http","ip" :"MgtIPAddress"},
            {"name": "provisioning_access" ,"type":
"PROVISIONING_ACCESS","port":"8080","protocol":"http","ip"
:"AppIPAddress","context":"walladapter"}
    ],
    "available_metrics":[
        {
"name":"total_users","metric_type":"NUM_USERS","data_type":
"INTEGER","statistic_type":"COUNT","units":"Users","resolution_units":
"INSTANTANEOUS"}
    ]
}
```

To be created, an application instance 162 may be assigned and allocated a set of resources within execution environment 160. In some embodiments, some resources may be specific to a particular execution container 161. Instantiation of the application instance 162 may not occur unless and until all requisite resources have been acquired. In certain embodiments, the remaining capacity of each execution container managed by infrastructure management layer 150 may be analyzed and considered when provisioning a new application instance. In some embodiments, infrastructure management layer 150 may have configurable thresholds for limited resources (such as IP pools) and may generate alarms when these thresholds are not met. A failure to atomically acquire the requisite resources for an application instance may result in failed instantiation, rollback of any changes made on its behalf, freeing of any resources already assigned to it, and the failure (or suspension and subsequent retry, as appropriate) of any user transaction(s) depending thereon.

Infrastructure management layer 150 may also control the deletion of application instances 162 when appropriate. In some embodiments, application instances 162 may be deemed vacant when they are no longer associated with any tenant application contexts 156 or tenant data 155. In some embodiments, deletion of vacant application instances 162 may occur automatically if excess spare capacity is detected by infrastructure management layer 150. Alternatively, deletion may be requested or forced via a request to infrastructure management layer 150.

Furthermore, application instances 162 may be pre-allocated by infrastructure management layer 150. In some embodiments, the instantiation and startup of a new application instance may take a long time, for example, longer than is desirable for user interaction. Free or unused applications instances 162 for a given capability may be instantiated ahead of time to speed onboarding or assignment of new tenants. In some embodiments, infrastructure management layer 150 may be empowered to automatically manage a pool of pre-allocated application instances. In some embodiments, infrastructure management layer 150 may choose whether pre-allocated application instances 162 are maintained in a stopped or running state, which functionality may be useful for capacity management.

Allocation of resources by infrastructure management layer 150 when instantiating application instances 162 may be done according to one or more capacity metrics. In some embodiments, these metrics are defined and declared in one or both of metadata 151, application template 152. Examples of capacity metrics include a number of tenants, a number of users, a number of user data objects (such as tickets or images), transactions per second, and a number of concurrent users. Each application instance 162 may also have its own resource requirements as well. Examples of these include CPU (e.g., number of cores), RAM, IOPs, and network bandwidth. Furthermore, there may also be commercial requirements that imply capacities, such as a number of seat licenses (within an environment), OS Licenses, or limitations due to trial licensing agreements, for example. In embodiments including commercial capacity limitations, such commercial capacities may or may not be "owned" or managed directly by infrastructure management layer 150. However, infrastructure management layer 150 may still be responsible for reserving them from, e.g., a third-party license server, or registering them with an auditing/tracking system.

In some embodiments, tenant-application creation requests may include capacity reservation information. For example, a given request may specify a requirement for 100 user seat licenses and 10 GB of document storage. In some embodiments, infrastructure management layer 150 may ensure that the created or existing application instance 162 to which the tenant-application is assigned has sufficient capacity to satisfy the request.

Subsequent provisioning operations for an existing tenant on an application instance may require increasing that tenant's reservation for one or more capacity resources—such as adding more users or increasing the tenant's allotted storage. However, because instances may serve multiple tenants, infrastructure management layer 150 may keep track of both the tenant's own reservations and the total reservations for that instance (over all tenants thereon). Such information may be kept in managed resource data 154. In particular embodiments, a user transaction requiring or requesting the allocation or deallocation of capacity-related resources may reserve such resources via infrastructure management layer 150 and the transaction may not complete successfully unless such reservation is successfully made.

Infrastructure management layer 150 itself may or may not have exclusive control over the resources it's reserving and allocating to capabilities and tenants. For example, the literal allocation of RAM to an instance may be performed by the hypervisor in a virtualization environment. As another example, a licensing server "owns" or manages the number of remaining licenses for a given product. Infrastructure management layer 150 does own, however, the mapping of that reservation to the tenant and capability for which it was reserved and is the authoritative source of record for the same. Thus, infrastructure management layer 150 is responsible for tracking each reservation's lifecycle. For example, if a tenant is moved to a different application instance 162 (e.g., from instance 162a to 162b), the resource reservations remain charged to/assigned to that TAC in tenant data 155; the old instance gets "credited" for applicable resources and the new instance gets "charged" for them. If the TAC is later destroyed, then all of its reserved/allocated resources may be freed up. In the case of commercially-implied capacities, this could mean "returning" the licenses to the license server.

In addition to resource management, in some embodiments, infrastructure management layer 150 may also handle metering of resources in execution environment 160. In such embodiments, each application will expose a metering interface via infrastructure API 163b. The metering interface permits infrastructure management layer 150 or other entities to query the present or past values for the capacity metrics it exposes Infrastructure management layer 150 may expose, via an API, read-only access to metering data for the applications it manages. In some embodiments, metering data for non-capacity-related metrics may be exposed in like manner. For example, an application may expose metrics relating to transaction response times; in some cases, such metrics may not relate to capacities or reservations, but may be of interest, for example, for monitoring the application's health or performance.

In the event that metering data indicates that a tenant or application instance is exceeding its reserved capacity (for example, too many concurrent user sessions or transactions per second), such information may be used to adjust the actual available capacity for that instance. System-level capacity monitoring, such as CPU utilization, memory utilization, or free disk space, are not the infrastructure management layer's responsibility. However, should the monitoring system or administrators determine that a given instance is being over-utilized (e.g., response times are slow due to CPU consumption), infrastructure management layer 150 may be able to respond accordingly, e.g., by marking the offending resource (e.g., CPU) as exhausted and denying the allocation of more resources on the instance.

When deciding where to home a given application instance or tenant, infrastructure management layer 150 may consider several factors, including each execution container's remaining resource capacity, the locations of other instances for the same tenant (which might make co-location on the same execution container more or less preferable), each execution container's remaining capacity in terms of total running applications and components, and/or the availability and/or maintenance status of a given execution container.

In particular embodiments, when considering a provisioning request, the present in-use capacity may be calculated as the maximum of the present reserved capacity and the actual in-use capacity, as determined, for example, by metering data. Moreover, in some embodiments, when deciding where to home a new tenant, infrastructure management layer 150 may leave some "headroom" or unused capacity on existing instances. For example, the addition of a given tenant should not exhaust the user capacity of an instance. The amount of headroom on each metric may be determined heuristically or empirically and so may be configurable via infrastructure management layer 150 API.

In some embodiments, infrastructure management layer 150 may support a feature wherein it maintains a pool of pre-created application instances for a given capability which will be used to fulfill new requests for that capability. The size of the pool, how many instances (if any) are powered on, or any other suitable metric of the pool may be configurable via infrastructure management layer 150's API. Some configurable default settings may also be applied to newly-added applications Infrastructure management layer 150 may, but need not commit resources, such as IP addresses, to these vacant instances. This is to say that an instance can exist (but not be started or necessarily have tenant assignments) without having all of its runtime resources committed or charged. Of course, for this instance to be used to fulfill a tenant provisioning request, infrastructure management layer 150 may be able to reserve and assign all other applicable resources—the process is identical except that the instance already exists. These pools will be created and replenished automatically by infrastructure management layer 150 at its convenience, based on system activity and configuration. In some embodiments, infrastructure management layer 150 may further provide a method, through an API, for operators to request that additional instances be pre-provisioned. This might be done, for example, in anticipation of a large batch of new tenant requests at the end of a fiscal quarter. As with all functions, pool-management-related and user-requested instance creation is managed via task module 157 and each action requires the acquisition of the appropriate resources.

Infrastructure management layer 150 may also delete tenants over time. In some cases, this will free up resources on multi-tenant applications. In other cases, this will leave "empty" application instances—i.e., instances which are not associated with any tenant. If pre-allocated pools are enabled, these vacant instances may be reused by those pools. In other cases, there may be an excess of vacant instances resulting in wasted system resources. If pooling is disabled (pool size=zero), then upon becoming vacant an instance may be immediately shut down and destroyed and any resources consumed by it may be freed. In embodiments having pooling is enabled, a high-water mark for each pool size may exist; if the size of the pool grows and stays above this threshold for some period of time, then one or more of the excess instances may be destroyed. In some embodiments, infrastructure management layer 150 may also, through an API, permit administrators to request the destruction of vacant application instances.

Some embodiments of infrastructure management layer 150 may also provide power state monitoring. Other facilities may be in place for the runtime monitoring of application (e.g., application availability or liveness), and these facilities may be empowered to restart or power on instances based on failure conditions. In some embodiments, infrastructure management layer 150 may coordinate (or help to coordinate) maintenance activities requiring the shutdown or restart of a given application instance. In such instances, infrastructure management layer 150 should be capable of fetching, understanding, and manipulating application power state. In some embodiments, it may be desirable for infrastructure management layer 150 to periodically query power state for its instances—e.g., if infrastructure management layer 150 is recovering from a cold restart and, as applicable, power on instances that are expected to be up and serving customers. In like manner, infrastructure management layer 150 may expose an API enabling administrators to explicitly shut down a given instance, e.g., for maintenance. In particular embodiments, when infrastructure management layer 150 has brought an instance down in this manner, requests towards this instance, e.g., routing requests from the dispatcher, may receive responses that explicitly state that the instance is down for maintenance. This permits disambiguation between truly failed instances and instances that are down for a reason.

Additionally, infrastructure management layer 150 may manage backup/restore operations associated with application instances 162 as a whole, or for individual tenants assigned to the application instance. As user data is backed up, infrastructure management layer 150 may be informed of the backup's location, recording this as a user data resource for a given tenant or tenants in managed resource data 154 and/or tenant data 155. The process of restoring an instance could then take several shapes. In one embodiment, user data may be restored directly into an instance (e.g., a database restore). In particular embodiments, infrastructure management layer 150 may need to coordinate with respect to scheduling of tasks, ensuring that the restored data matches the current (e.g., schema) version(s) of the present application instance, partially shutting down or quiescing the application or tenant within the application during the restoration procedure, or restarting or reactivating the application or tenant post-restoration.

In one embodiment, user data for an entire application instance may be restored by swapping in a backup copy of a user data volume. The role of infrastructure management layer 150 would then include scheduling the modification(s) to the respective instance, checking that the inbound volume is "current enough"—e.g., it is not missing any new tenants that have been added since the backup was created, checking that the volume is of a compatible schema version with the running application, and providing operations with the scope of impact of the maintenance operation with respect to the tenants involved. Restoration by infrastructure management layer 150 may then include shutting down a running application instance, moving/exporting existing user data volume(s), importing backup volume(s), restarting the application instance, and performing some kind of sanity validation that the instance is alive. In the event of a failure of the restoration, infrastructure management layer 150 can reverse the above process to restore the original volume. This action is not tenant aware.

In some embodiments, infrastructure management layer 150 may also work to import data into a new application instance. In such embodiments, infrastructure management layer 150 creates a new application instance. However, instead of creating the user data volumes from scratch, it uses backups. Either new resources are assigned to the new instance or resources are transferred from the existing instance, and the new instance is brought up and validated. The old instance is then disposed of appropriately by infrastructure management layer 150. In this discussion, we see the level of interaction required between infrastructure management layer 150 and external components. It should be noted that some functions described as being done by infrastructure management layer 150 may not be proper "features" of infrastructure management layer 150, but, rather, processes built on top of an API associated with infrastructure management layer 150. Insofar as volumes, application instances, power states, or other application components or attributes are being manipulated, these functions are performed by infrastructure management layer 150, but driven by the API associated with infrastructure management layer 150.

Infrastructure management layer 150 may additionally be involved in disaster recovery activities. Disaster recovery may refer to the process and implementation for re-establishing services that have been disabled, disconnected, or destroyed by a catastrophic event. The context is not one of a server going down, but rather of the failure/unavailability of an entire datacenter or more. To handle such events, backups or replicas of infrastructure management layer 150 itself (and its databases) and each tenant's/component's data will be located at other datacenters. (It is assumed, in aggregate, the remaining set of datacenters has sufficient capacity to service these additional instances.)

For example, an instance of a capability providing the implementation for a first TAC T is destroyed or is otherwise rendered permanently unavailable at a first datacenter DC1 (managed by a first infrastructure management layer, AIM1). It may then be administratively or automatically determined that the instance must be resurrected at a second data center, DC2 (managed by a second infrastructure management layer, AIM2). The second infrastructure management layer is instructed (either through some specific feature or through composition of existing APIs) to "take ownership" of the first TAC T and materialize it on an instance in the second datacenter DC2. The AIM2 server presumptively has a read-only replica of AIM1's data store. AIM2 fetches all of T1's data from AIM1's database (which it can safely do because all identifiers are UUIDs, including those for, e.g., application descriptors (which are assigned when the descriptor is created.)). AIM2 is now in possession of all information required to reconstruct an instance for T1, namely: its application descriptor, the locations of its non-user data volumes, the sizes and shapes of its non-user data volumes, the values of any instance-specific configuration properties (non-site-specific, non-environment-specific properties), references, via the application descriptor, for the values of, e.g., "credentials" or other value types, reservations for resources not managed by infrastructure management layer 150 such as licenses (as applicable), and resource requirements (based on reservations AND actual metering data). AIM2 can now begin the process of reserving whatever other resources/capacities are required, including locating and obtaining user data files/volumes. Once reservations/allocations are obtained, AIM2 assigns T1's context to a new or existing Application Instance, moves data in, and (re)starts the instance, as appropriate. Another step in this process might be for AIM2 to enqueue a job whose purpose is to notify AIM1, should it ever come back up, that AIM2 now has ownership of T1; AIM1 would then be responsible for cleaning itself up, as appropriate.

Figure 2:
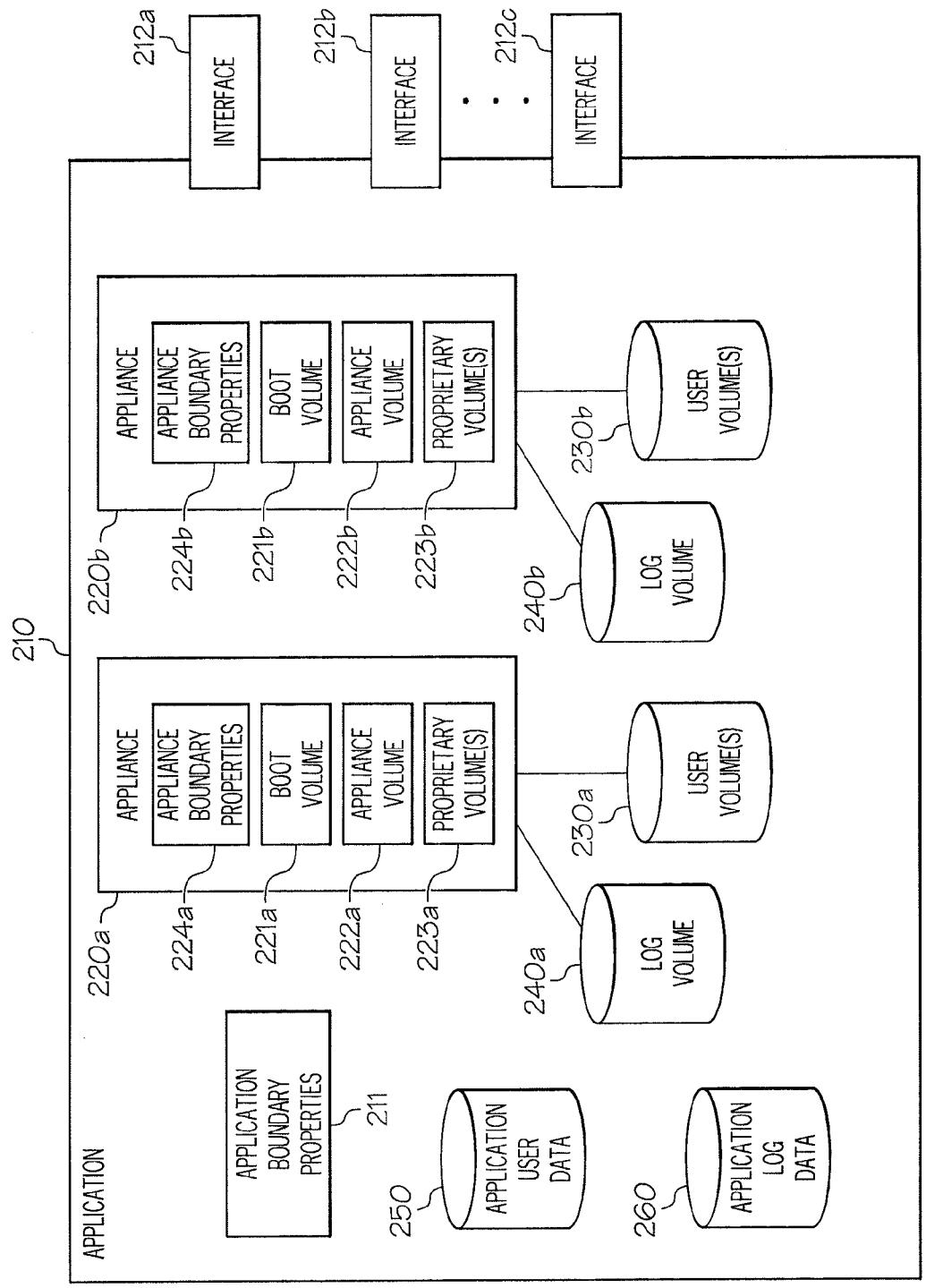
FIG. 2 illustrates an example logical view of a SaaS application.

FIG. 2 illustrates an example logical view of an application instance 210 comprising boundary properties 211, interfaces 212, appliances 220, user volumes 230, log volumes 240, application user volume 250, and application log volume 260 according to particular embodiments of the present disclosure.

As explained above and shown in FIG. 2, each application instance 210 may be composed of one or more appliance instances 220. Appliance instances 220 may have several common characteristics. For instance, each appliance 220 may have a set of appliance boundary properties 224, which may include volume definitions, resource requirements, and other metadata of the appliance. In addition, appliances 220 may be shipped as images in catalogs and subsequently stored in an appliance image repository (e.g. appliance image repository 153 of FIG. 1). Appliances 220 may be instantiated within application instances (e.g. application instances 162 of FIG. 1). Every instance of a particular appliance 220 (or class) is identical at initial startup. In other words, if customer X and customer Y are both using version V of some appliance 220, then they are running exact copies of the same appliance 220 and they differ only in boundary configuration and user data contents.

Appliances come in two different forms, mainly: host appliances and cluster appliances (or assemblies). Standards for each form differ and will be discussed below. Host appliances are literally virtual machine (VM) images. They consist of one or more volumes and metadata. "Cluster" appliances (or assemblies), on the other hand, are assemblies of one or more other appliances that are encapsulated so as to look, act, and be managed just like host appliances. Cluster appliances are "run" (powered on), but are not "real" hosts; the assembly itself has no Operating System and consumes no resources (note, however, that the appliances the assembly encapsulates do consume resources). Much like an application template is a "recipe" for creating an instance of a particular application, a cluster appliance is a pre-defined set of appliances and configuration encapsulated in a neat "black box" that is accessed via interfaces.

Catalog appliances (e.g., those located in a repository such as appliance image repository 153 of FIG. 1) are host images. The configuration and disk contents of a catalog appliance are the same every time it starts. Booting up a catalog appliance is analogous to booting off of a Live CD—the exact same code and configuration are used. All instances of a particular catalog appliance are identical; if the catalog appliance is updated, all instances will see the change upon restart.

Another form of appliance is the singleton appliance. A singleton exists exclusively within the context of a specific Application Instance. Unlike a catalog appliance, changes to singletons are persistent. For example, every singleton host has its own unique history, persisting configuration data, and/or software patches. Whereas a catalog appliance is analogous to a Live CD, a singleton is analogous to having installed an OS and application onto a server's hard disk; i.e., changes are persisted and the system no longer is tied to the installation media. The contents of a singleton will naturally tend to diverge from its initial state. Traditional servers are essentially singletons. Thus, a singleton comes along with all of the operational challenges and headaches associated with managing traditional servers. Every instance of a particular catalog appliance is identical; among other things, this means that all such instances can be changed via a single change to the respective catalog appliance. In contrast, every singleton is unique and, regardless of its origin, has no relationship to any version-controlled objects. Singleton hosts allow configuration drift, and require traditional upgrades and whole application backups—practices inconsistent with efficient mass deployment. They can, however, be managed and maintained using traditional enterprise approaches.

In some situations, such as when there is a persistent license associated with an appliance instance, the appliance instance can run as a singleton retaining new state. However, the appliance may otherwise conform to the restriction that such state is completely independent of how the appliance instance behaves. That the singleton is considered disposable/replaceable as long as it starts, stops, backs-up and restores user data with no difference in functionality independent of which singleton the data is associated with.

In particular embodiments, application 210 may include boundary properties 211, which may store, for example, information about what the application connects to in order to be properly configured. Some parameters may be defined so that these properties can be properly built into the appliance's configuration at start time. In some embodiments, the standard is that all application-instance-specific configuration parameters are externalized. Once part of an application assembly or appliance cluster, these parameter values will be chained together and eventually externalized. There are also generic, externalized boundary properties 211 that the provisioning system sets for all applications. These properties can be imported from application 210 and used in the startup process for each appliance 220.

Data volumes (e.g., user volume 230 and application user volume 250) may include certain user data written durably to disk by application 210—i.e., persistent data. Data written to appliance instance volumes (e.g., appliance volume 220, or the appliance volumes off of which a particular appliance instance runs) is not persistent—it is never backed up and can be lost any time the Appliance restarts. Application data that requires persistence may be referred to as user data. In particular embodiments, user data may be written to user volumes (e.g., user volume 230 and application user volume 250)—volumes which are explicitly created, assigned to specific appliances (via the overall application's assembly), and are managed by a specific application instance. User volumes may also be used to store log files, monitoring data, paging files/swap space, or other persistent information about an appliance or the application (e.g., at log volume 240 and application log volume 260). These volumes don't technically contain "user data" but function in the same manner—the volumes themselves are created within and managed by an application instance. In some embodiments, application user data 250 may be a virtual identification of or reference to individual user volumes 230 within application 210. Likewise, in some embodiments, application log data 250 may be a virtual identification of or reference to individual log volumes 240 within application 210.

In some embodiments, application descriptors may specify what user volumes an application requires and what types of volume they are—whether true User Data or "other"—such as logs. The backup, security, auditing, and other operational requirements for different types of volumes may vary. User data proper may be backed up using a common backup mechanism. In certain embodiments, backups may occur at the application level by default; in other embodiments backups may occur at a volume level. It should be noted that every single piece of user data should be associated to exactly one tenant on the system. This is because there is no notion of persistent "system" data or "configuration" data, except to the extent that such data is specific to a particular tenant.

Configured as such, application 210 can be distributed from a central control point as a set of version-controlled components. Such components may include application templates, appliances 220, and application descriptors. Creation of user data volumes may be separate from application distribution. Further, application 210 may have a boundary separating external configuration from internal configuration. For instance, a version number may reflect an internal configuration. However, in some embodiments, the version presented by the external boundary may reflect exactly one collection of internal component versions.

In some embodiments, resources in or used by application 210 are provisioned using a parametric description language applicable to multiple types of applications and not particular to any one type of application. Application instances can be instantiated from a single application template. Application 210 may use external services, such as a collaboration service or a transaction/database service. Tenants of application 210 can be allocated as a separate step from resource provisioning.

In some embodiments, application 210 becomes a host to at least one tenant. Application 210 exposes a common interface via which it is provisioned for new tenants. Tenants may be associated with tenant IDs that can be globally-unique. Provisioning a tenant can involve initializing data in application 210 and removing a tenant can involve deleting tenant data from application 210. Tenant data can be stored in application user volume 250 and/or user volumes 230. Resources consumed by application 210 can be reported on a per tenant basis as well as a per application instance basis. Application 210 can expose at least one capacity metric. A common API is used to fetch values of these metrics. Tenant provisioning can be automated through a standard OData interface on the management network.

In some embodiments, application 210 can include an interface for provisioning users to support single sign on (SSO). As an example, an OData interface on the management network can be used to add and delete users. Users can be added at two levels: admin (all powerful) and basic user (minimal access). In some embodiments, application 210 can expose additional roles. In other embodiments, when SSO is not available, application 210 can include user database and authentication methods.

In some embodiments, application 210 can be deployable and maintainable in an execution container 161. Application 210 can be deployed in a cloud network such as one deployed by CA Technologies, as well as in other public and private cloud networks. In private cloud networks, application 210 may be able to communicate within private networks. In some embodiments, application 210 may use agents to access remote private networks. Such agents can be centrally-configured and maintained. Application 210 can be accessible from a network-routable location. References to external services can be done by names (e.g., resolved by DNS).

In some embodiments, application 210 can include internal monitoring. For example, application 210 can include a monitor appliance (e.g., appliance 220a) which provides monitoring for application 210. For example, this monitoring appliance can be implemented using the APPLOGIC "MON" appliance provided by CA Technologies. The "MON" appliance aggregates all internal monitoring so that the application can be monitored as a single entity.

The "MON" appliance in this example can have built-in connectivity to monitoring systems, a third party probe, such as NIMSOFT probes or exposing SNMP MIBs. At runtime, each of appliances 220a-b can stream generic monitoring metrics and application-specific metrics and critical events on a single connection to a monitor appliance. This does not disable use of additional specialized monitoring probes, such as Oracle database probes on each of two redundant appliance instances. Instead the mon acts as a single point that can differentiate monitoring results by "whole application" information versus information that exposes internal architecture of the application. In particular embodiments, all monitoring activity within the application is funneled through the mon appliance such that all applications may be monitored in an identical manner.

In some embodiments, appliances 220 may be further partitioned, such that read-only volumes containing proprietary code may be distributed separately from the pre-configured operating system and other components of each appliance 220.

In some embodiments, appliances 220 may be further partitioned, such that read-only volumes containing Open-Source or third-party-licensed code may be distributed separately from the pre-configured operating system and other components of each appliance 220. In yet other embodiments, appliances 220 may be distributed such that certain volumes can be built by end-customers themselves, for example, to comply with certain licensing or regulatory restrictions.

In some embodiments, application 210 exposes two ingress network interfaces: interface 212*a* on a DMZ network that provides ingress for user sessions, interface 212*b* on a management network that provides ingress for management and operational functions, and interface 212*c* that provides egress onto the management network. Networking within application 210 may be private. Addresses internal to application 320 may be assigned dynamically and connections between appliances 220*a-b* may be made explicit via definition in the respective application metadata. Such inter-appliance connections can be protocol-restricted (e.g., NFS or HTTP), as appropriate. In some embodiments, appliances 220*a-b* may not have external network interfaces. In particular embodiments, only specialized gateway appliances have external network interfaces—and thus access to extra-application networks; in such embodiments, all intra-application communication is via private networks. Access to appliances 220*a-b* by external resources may be through a firewall (e.g., provided by CA APPLOGIC appliance), and the firewall may be specifically configured to protect this application using whitelist-only policies. For example the application may not create connections to the internet. Access to certain internal components of application 210 can be via the management network and can use standardized ports.

An example inbound interface descriptor is shown below:

```
#Comments denoted by '#'
#Inbound gateway appliance
component IN
{
  .category              = Gateways
  .description           = "Input Gateway Appliance - iptables based
incoming connection gateway with firewall (v3.0.2-1)"
  volume boot            : class                , boot               ,
dev = /dev/hda , type = instantiable
  volume usr             : class                , shared             ,
ro           , dev = /dev/hdb        , type = common
  resource cpu           : min        = 0.05    , max       = 4      ,
dflt = 0.05
  resource mem           : min        = 96M     , max       = 2G     ,
dflt = 96M
  resource bw            : min        = 1M      , max       = 2G     ,
dflt = 200M
  output out             : protocol   = any
  output mon             : protocol   = cce
  interface default
  interface external
  property ip_addr       : mandatory             , type     = ip_owned
  property netmask       : mandatory             , type     = ip_addr
  property gateway       : type       = ip_addr , dflt     = ""
  property allowed_hosts : type       = string  , dflt     = 0.0.0.0/0
  property denied_hosts  : type       = string  , dflt     = ""
  property iface1_protocol : type     = string  , values   = none|tcp|udp ,
dflt = tcp
  property iface1_port   : type       = string  , dflt     = 80
  property iface2_protocol : type     = string  , values   = none|tcp|udp ,
dflt = none
  property iface2_port   : type       = string  , dflt     = 0
  property iface3_protocol : type     = string  , values   = none|tcp|udp ,
dflt = none
  property iface3_port   : type       = string  , dflt     = 0
  property iface4_protocol : type     = integer , dflt     = 0
  property iface4_port   : type       = string  , dflt     = 0
}
```

An example outbound interface descriptor is shown below:

```
#Comments denoted by '#'
#Outbound network gateway
component OUT_GW
{
  .category              = Gateways
  .description           = "Subnet Output Gateway Appliance with DNS proxy."
  volume boot            : class                , boot               , dev
= /dev/hda1 , type = instantiable
  volume usr             : class                , shared             , ro
, dev = /dev/hda2 , type = common
  resource cpu           : min        = 0.05    , max       = 4      , dflt
= 0.05
  resource mem           : min        = 64M     , max       = 2G     , dflt
= 64M
  resource bw            : min        = 1M      , max       = 2G     , dflt
= 200M
  input in               : protocol   = any
  output mon             : protocol   = cce
```

```
interface default
interface external
property ip_addr        : mandatory                  , type  = ip_owned
property netmask        : mandatory                  , type  = ip_addr
property gateway        : type       = ip_addr       , dflt  = ""
property dns1           : type       = ip_addr       , dflt  = ""
property dns2           : type       = ip_addr       , dflt  = ""
property allowed_hosts  : type       = string        , dflt  = 0.0.0.0/0
property denied_hosts   : type       = string        , dflt  = ""
property ip_addr2       : type       = ip_owned      , dflt  = ""
property netmask2       : type       = ip_addr       , dflt  = ""
property gateway2       : type       = ip_addr       , dflt  = ""
}
```

In some embodiments, application 210 may be upgraded. Such upgrades may be systematic, automated, and driven via a common interface. In some embodiments, upgrades may be accomplished by stopping application 210, altering its metadata such that it references newer versions of one or more of its constituent appliances, and then restarted with the new version with pre-existing user data (e.g., stored in user volumes 230), boundary properties 211, and log volumes 240. If data changes (such as database schema modifications) are required, the logic to perform these changes may be included in the new versions of the appliances in application 210 (e.g., new versions of appliances 220a-b). In some embodiments, an individual appliance may be upgraded without shutting down application 210. An upgrade can be implemented as a time-controlled backup and restore process resulting in a newer version of application 210. New versions of appliances 220 can detect version changes and update user data (e.g., schemas). In some embodiments, appliances 220 can detect when the version of user data to which they are attached is higher or lower than the software on the appliance is compatible with; in such embodiments, appliances in this situation may automatically abort startup to avoid, for example, data corruption or loss.

In some embodiments, patches to application 210 may be performed by copying patch files to the volume cache for a given appliance. In some embodiments, such patches may remain on every restart of application 210. In other embodiments, such patches may be lost upon restart of application 210.

In some embodiments, developmental versions of appliances 220 and/or application 210 function similarly or the same as in production, except that certain version control, performance and security standards can be relaxed to enable developer productivity. For example, during development, proprietary code can be dynamically downloaded by an appliance as a result of a new build. To do this during development appliances may have network egress rights that may not be allowed in a secure production environment. The common bootstrap scripts can be configured to do this automatically using boundary parameters. Entire deployments can be upgraded and re-tested with reduced human intervention, in some cases without human intervention in a development environment. In a release environment boundary parameters inform the bootstrap script to skip the download step. In some embodiments, appliances may be altered during the release process such that the download functionality is permanently disabled. As a second example, during development, application configurations that are neither redundant nor resource intensive may be used thereby reducing the hardware resource requirements for development execution containers. During release assembly, new versions of appliances 220 are placed into production-grade application configurations (e.g., templates and assemblies). In particular embodiments, such changes are accomplished purely via changes to the application metadata. For example, if multiple application servers, fronted by a load balancer, are used in production, then a development application might use only a single application server (still behind the same load balancer). Similarly, production firewalls may be configured to block network egress that developers may need for easy debugging.

In some embodiments, application 210 may include internal redundancy. Appliances 220 can be designed to support redundancy. In some embodiments, appliances 220 can be built such that the same appliance can be configured for redundant or non-redundant operation. In yet other embodiments, whole applications can be built that support inter-instance replication. In some embodiments, disaster recovery can be based on modified backup and restore procedures. In some embodiments, the restoration procedure can be altered to implement certain features, for example, redacting PII, filtering out obsolete data, or restoring only specific tenants or users. Backups can be saved to remote resources and application templates, catalogue appliances, and application descriptors are available at the respective remote site(s).

In some embodiments, application 210 can include an appliance that performs logging. Such data may be included in log volumes 240 and/or application log volume 260. In some embodiments, appliances 220 can perform logging using a network storage protocol, such as NFS or CIFS. Logging programs can have an interface via which log files can be downloaded and archived. In some embodiments, logging programs or appliances may be configured to upload log files to a particular location.

In some embodiments, application 210 functionality may include backup and restoration functions for application instances and their constituent appliances. All user data is stored on user data volumes (e.g., user volumes 230) separate from the operating system of an appliance and other code associated with the functions of the appliance generically (i.e. how all appliances of that type function and/or execute), but not specifically (i.e., related to the specific instance deployed in a certain environment). In some embodiments, every piece of data that can be backed up is associated with one tenant. In such embodiments, a "backup" or "restore" request effectively asks the application to, e.g., "backup tenant X." Data backup should include a means to ensure that data is consistent across volumes or database snapshot sources.

In some embodiments, the direct backup of entire user data volumes is used for restorable procedures and is the minimal form of backup that should be supported by applications. In some embodiments, whole-volume backups may require shutting down the instance of application 210 first.

This type of backup may be associated with some downtime, however. Backups while application 210 is running can be invoked through a common OData interface exposed by the application instance. Within the application instance, there is a common appliance (e.g., appliance 220a) which coordinates the backups of individual appliances (e.g., appliance 220b). Appliances 220 can include a backup software agent (a common component) and an application-specific plugin. Some embodiments may support continuous data backup.

Service restoration can use backups in an automated way, in various locations. Restores mirror backups. They can be specified on a per-tenant basis or a per-application instance basis. Restoration involves restoring tenant-specific user data onto a compatible version of application 210. In particular embodiments, restoration may be invoked through a common OData API exposed by application 210. Restoration can use the output of a prior backup operation and restore the specified tenant's data. In some embodiments, restoration may require downtime for a tenant or an application instance, but this is an application-specific decision. As with backup, in some embodiments, restoration can be coordinated by a common appliance which manages data restoration on the application instance's constituent components.

In some embodiments, licensing of all third party products can be tracked, and open source distribution limitations are possible. Appliances 220 may separate proprietary software from the operating system and other capabilities by the use of separate volumes (e.g., boot volumes 221, appliance volumes 222, and one or more proprietary volumes 223). The release process for applications can include the packaging and archiving of all license-related information. Each released artifact will be uniquely associated to such a bundle of license information. Reporting of use of licensed components may be via a common monitor appliance (e.g., appliance 220b) that can include mechanisms used for telemetric collection.

In some embodiments, metering of capacity metrics may be performed. This may be performed through a standard API exposed by application 210. Applications can specify at least one capacity metric, such as its tenant capacity (e.g., maximum number of tenants). The capacity metrics of each application type will differ; examples include a number of users, a number of concurrent sessions possible, a transaction rate, and tenant-scoped file storage capacity. The capacities are generically defined as attribute-value pairs for a specific time frame as part of an application descriptor. Multiple statistic types (e.g., minimum, maximum, average, count, percentiles, instantaneous) may be supported for metering, along with multiple time frame resolutions.

In particular embodiments, the metering interface of application 210 may be exposed via a standard OData interface. Metering data may be accessed via a management network. In one embodiment, an OData front-end is coupled with application-specific plugins on the same appliance 220 that exposes, e.g., tenant provisioning. Capacity reserved and consumed by application 210 can be reported on a per-tenant basis as well as a per-application instance basis. Applications may report other metrics that are not specifically capacity-related, such as: tickets created per hour, distinct user logins per day, and performance-related statistics (e.g., transactional latencies).

In some embodiments, host security and access control may be performed. Access controls are managed at the application instance level. In some embodiments, all hosts are catalog appliances and can be cleaned—have their volumes re-imaged from the catalog at any time. In some embodiments, none of the hosts will have user-specific access controls. In some embodiments, hosts do not communicate directly with outside components and communication may be through sanctioned firewall/gateway appliances within application 210.

In particular embodiments, appliances instances may be versioned. For applications with static configuration controls, 220 may not be directly patched. Rather, operating system, third-party, and/or application patches are introduced through upgrade mechanisms. Appliances themselves run in a very private, strictly-controlled context—making it difficult to exploit many equivalence classes of vulnerabilities. It is expected that security patches will be applied, however, and that such applications will be infrequent (e.g., only aligned with new application version releases). If versioning of applications is dynamic, upgrades are systematically deployed such that production network egress and ingress security constraints are enforced, and that application version is modified transactionally. This is important to preserve predictability of operational behavior and compatibility of data backups for restoration purposes.

In particular embodiments, troubleshooting access to a running application will be standardized by support tier, and access given only as needed. Access to externalized data, as well as to specific internals of an application instance should be fully enabled over the management network through standard interfaces. Such access is restricted in a tiered fashion to enable troubleshooting productivity while protecting user data and maintaining "least privilege" standard. In one embodiment, for example, Tier-1 support's view is restricted to specific external interfaces (e.g., a "black box" view). Thus, Tier-1 does not have access to internals nor to user data. Access to internals of application 210, on the other hand, has two levels: Tier 2, which enables a Tier-2 support person to perform more detailed troubleshooting while protecting user data, and Tier 3, which enables full access to the application and user data for higher escalations.

In some embodiments, appliance 220a may be a logger appliance. The logger appliance may automatically archive log data locally and expose those logs for external access to authorized and authenticated personnel/systems. Log data, or log files, may refer to write-once data to be archived that is not part of the direct function of the application, but typically used for audit, troubleshooting, or bug-fixing purposes. For instance, log data may include any data that need not be restored in order to recover an application's functionality, though such log data may be used for a variety of reporting and analytic purposes, and may require access controls around its subsequent use.

The logger appliance may also expose an OData interface via which requests for instantaneous log snapshots can be fetched, e.g., to attach to a trouble ticket. In some embodiments, the ability to change run-time log levels (e.g., errors only, errors & warnings, and/or information) on a per-application or per-tenant basis will be exposed as standard OData interface. In particular embodiments, standard definitions for the semantics of specific log levels (e.g., debug, information, and/or warnings) are defined and applications can adhere to them. Log data may be fully-contained on a single logger appliance for the entire application instance. Log data whose contents conforms to logging statement labeling standards for time, tenant, severity, and source may be filtered appropriately when requested.

An example logger appliance descriptor is shown below:

```
#Comments denoted by '#'
#Logger appliance
component logger
    {
    .description                              = "Logger. Provides network-
attached storage via NFS and CIFS for appliance logging."
    volume boot                      : class                    , boot
, dev      = /dev/hda1      , type = instantiable
    volume usr                       : class                    , shared
, ro                        , dev = /dev/hda2     , type = common
    #User data volume for log storage
    volume data                      : mandatory                , dev
= /dev/hda3
    resource cpu                     : min        = 0.10        , max
= 16        , dflt    = 0.20
    resource mem                     : min        = 64M         , max
= 32G       , dflt    = 256M
    resource bw                      : min        = 1M          , max
= 2G        , dflt    = 250M
    #Example of protocol-specific inputs
    input http                       : protocol   = http
    input nfs                        : protocol   = nfs
    input cifs                       : protocol   = cifs
    output mon                       : protocol   = cce
    interface default
    property logs_retention_period_in_days   : type     = integer    , dflt
= 7
    property log_cron_job_interval_in_minutes : type    = integer    , dflt
= 720
    property http_url_prefix         : type       = string      , dflt
= /
    property http_dir_enabled        : lowercase               , type
= string            , values = yes|no         , dflt = yes
    property http_sec_mode           : lowercase               , type
= string            , values = none|single|htpasswd    , dflt = single
    property http_sec_realm          : type       = string      , dflt
= "Restricted Area"
    property http_user               : type       = string      , dflt
= ""
    property http_pwd                : type       = string      , dflt
= ""
    property cifs_read_only          : lowercase               , type
= string            , values = yes|no         , dflt = no
    property cifs_case_sensitive     : lowercase               , type
= string            , values = yes|no         , dflt = no
    property nfs_read_only           : lowercase               , type
= string            , values = no|yes         , dflt = no
    property log_dir                 : type       = string      , dflt
= /
    property timezone                : type       = string      , dflt
= "UTC"
    }
```

In some embodiments, access to application instances and/or volumes is limited and tracked. For example, Tier 1 support may not directly access any user data. Restrictive (need-to-know) access rights should be implemented at multiple levels, including at the whole-deployment level, the execution container level, the storage level, or any other suitable level. In some embodiments, facilities will be available to enable automatic logging of potential access to user data on the in each execution container. In some cases, proper audit controls may require that all sensitive logging data conform to logging statement labeling standards, e.g., such that logs can be "redacted" prior to transmission to support personnel. Application 210 can conform to content-driven audit requirements.

In some embodiments, a general release process may be followed. For example, application artifacts (appliances, application templates, and application descriptors) may move from a development stage to a lockdown stage. After lockdown, artifacts are assigned standardized, version-controlled identifiers and names and are stored in a configuration management system of record. Only artifacts sourced from the system of record can receive official QA. The system of record may be the sole source of artifacts for all downstream consumers and distribution channels.

In some embodiments, there may be a standard, streamlined path from development to production for appliances 220 that ensures conformance to configuration management and quality control standards. Appliances from development are made production-ready by, inter alia: adding proprietary software components to appliances; external update mechanisms, if any, are disabled (because the development-scope automatic update feature is part of the common appliance automation suite, such disablement is standardized and straightforward); all historical or runtime artifacts, such as shell history, locally-stored log information, staged files, temporary files (e.g., packages used only to assist in development) are erased; and instance and shared volumes are shrunk, as appropriate. After the above cleanup and lockdown, appliances are assigned unique, version-controlled identifiers, names, and are moved into specific catalogues, as per the configuration management processes.

In some embodiments, there may be a standard, streamlined path from development to production for applications that ensures conformance to configuration management and quality control standards. Production application templates start out based on those provided by development. They are made standards-conformant with respect to topology and naming conventions. In addition, they are fitted for redundancy and capacity (e.g., add additional application servers behind the load balancer), and are sized according to the application's capacity and performance nameplate ratings.

In some embodiments, hardware resources may be tuned during the release and testing processes to meet capacity requirements. In particular embodiments, resource tuning (e.g., memory, CPU, and JVM heap sizes) is performed in production-specification quality assurance execution containers. The same tuning is then implemented in the application template (and possibly appliances) before release to the system of record. The official application descriptors are updated, assigned unique IDs, and/or version IDs and are delivered along with the associated application template(s) and catalog appliances. In some embodiments, a plurality of performance or capacity configurations may be supported by the same application via boundary parameters. In yet other embodiments, a plurality of application profiles may be released, each supporting different performance or capacity requirements.

Referring back to FIG. 1, in particular embodiments, infrastructure management layer 150 may create and be the logical owner of any and all user volumes associated with the application instances it manages. Infrastructure management layer 150 explicitly creates these volumes at instantiation time and sets the application instance's properties accordingly. Infrastructure management layer 150 can identify and can be queried for the set of volumes containing a given tenant's data for a given capability. To the extent that copies of user volumes or user data are stored elsewhere (e.g., in a backup system), infrastructure management layer 150 is the authoritative source of record for the mapping of those copies to the respective tenants. In most embodiments, infrastructure management layer 150 maintains references between user data volumes and user data may also maintain a reference to the respective application descriptor for which they were most recently associated. This is to say that user data for a particular capability can exist independent of an application instance. The application descriptor that presently applies to a given application instance should be persisted by infrastructure management layer 150. It should be possible to query infrastructure management layer 150 for a given instance's descriptor. In the event that the descriptor for a given capability is modified or deleted, it should still be possible for infrastructure management layer 150 to fetch the descriptor that was in effect when a given application instance was created.

As explained above, communication with application 210 may only occur through one or more protocols or APIs via specific communications interfaces (e.g., interfaces 212) such that application 210 effectively becomes a "black box" to outside users/applications and management elements.

In particular embodiments, a variety of management APIs may be exposed, such as a backup/restore interface (e.g., backupTenant( ) restoreInstance( ) checkBackupStatus( ), a start/stop/pause/quiesce/awaken interface (e.g., quiesceApplication( ) resumeApplication( ) stopApplicationServices( ), a log level change interface (e.g., setLogLevel( ) disableAllDebugging( ) downloadLogs( ), and a monitoring interface (e.g., getMetric( ) listMetrics( ) resetCounters( ), tenant management (createTenant( ) modifyTenant( ) listTenants( ) disableTenant( ), user management (createUser( ) modifyUser( ) listUsers( ) deleteUser( ), role management (listRoles( ) addRole( ) modifyRole( ) and deleteRole( ). These interfaces may be OData interfaces according to the OData protocol. In some embodiments, every application may include an "adapter appliance", which provides a common OData interface for management and provisioning functions. For example, the adapter appliance may receive a request to perform a backup, and where the backup will be stored. In turn, the agent would be programmed to know which appliances 220 within application 210 have data to be backed up. The adapter appliance may be implemented as a Java web application housed in a Servlet Container in some embodiments. The common OData layer and other parts may be provided as part of the platform, with each application being required to implement plugins (based on a simple Java Interface, for example) which perform the details of such functions as provisioning a tenant or reporting metering data.

An example backup/restore interface may include an embedded BackupAgent module. The BackupAgent module may be a piece of software running on each appliance requiring backup/restore services. For example, in some embodiments, the BackupAgent module may be a lightweight Java web service, for example, housed in a Servlet Container, which exposes an OData interface. In particular embodiments, the adapter appliance may send commands to this interface to request the invocation of backup and restore operations. In such embodiments, the adapter appliance itself may mount some external NFS filesystem. It may then re-export this mount point locally, within the application. Each appliance that needs to back up files then mounts the adapter's export. The mounting process may be handled by the BackupAgent's common layer. In some embodiments, the adapter may re-export this mount point such that the set of files accessible to each appliance is limited to the scope of the given application instance or even to each specific appliance so as to provide additional security, least-privilege, and defense-in-depth. Each appliance 220 requiring backup/restore services may implement a plugin (e.g., a Java plugin) that implements a supplied interface (e.g., a Java interface). The appliance-specific details of the backup and restore procedures (e.g., snapshot and back up the database) are handled within this plugin. The plugin is also responsible for generating a manifest file containing, among other things, a listing of all the files generated by the backup, their checksums (e.g., MD5 or SHA-1 hashes), and possibly other application-specific metadata. This manifest file may be used later on during the restore process to validate the integrity of the backup artifacts.

In some embodiments, a log level interface may be utilized in application 210 to change one or more logging rules or procedures. For example, applications may log all errors by default, along with whatever else is necessary for that application. Being able to increase or decrease log levels at run time is optional, but may be preferable. In some embodiments, an application may enable changing some or all generic log levels through the log level interface. It is desirable that logging be able to be changed on a per tenant basis, too, and this may also be changed through log level interface as well. In further embodiments, an application may have some logging semantics, such as logging specific to a subset of it functionality. Some embodiments of the log level interface may enable pass-through of such application specific logs.

In some embodiments, a monitoring interface may be utilized in application 210 to change or access one or more monitoring functions for an application. In some embodiments, a "mon" appliance may be associated with the monitoring interface. This mon appliance may, by default, receive some amount of base appliance metrics every few seconds. The mon appliance's reporting frequency and detail is useful when debugging or validating inside the application. The mon appliance may allow, in some embodiments, a user to view the useful groups of data in real time. In some embodiments, the mon appliance or monitoring interface may expose aggregated views of data, such as moving averages or rank-and-order statistics. The mon appliance may expose all the details of the application too, so using it may require some knowledge of application internals. In some embodiments, appliances include web interfaces for additional monitoring capability. Each web interface may implement its own simple authentication based on parameter values passed into the appliance's boundary, or be integrated into an environment-level access control system. These interfaces are considered tier 2 support interfaces, in that they are necessary for debugging internal operational issues of the application. In certain embodiments, it may be desirable to include additional tier 3 (i.e., support for application functionality debugging) web interfaces as well. Other embodiments may expose application monitoring via other interfaces or protocols, such as SNMP.

An example mon appliance descriptor is shown below:

ing, deployment, monitoring, backup, restoration, networking, licensing, metering, host security and access control, upgrade, basic troubleshooting and repair, and audit. It may also include enabling Tier 2 and Tier 3 support to troubleshoot an application instance. When the implementation includes restriction of access to internal components, this distinction separates access control for the tiers of support. Importantly, tier 2 and tier 3 support can now be performed without enabling access to the external multi-application environment.

In current systems, all data related to an application is configured in such a way that the data is intermingled. Because of this, provisioning and/or upgrading such applications may be labor intensive, prone to human error, and carry high risk. In addition, access to log files and user data may be difficult. Furthermore, using more than one application that is delivered according to current systems may have many seams that may hinder productivity and integration.

Thus, according to particular embodiments of the present disclosure, appliance 310 may logically separate its environment/instance specific properties 320, common appliance artifacts 330, user data 340, and log data 350. In doing this, user data and log data may be transferrable between instances of an application, providing increased efficiency in SaaS environments due to rapid provisioning, migration, restora-

```
#Comments denoted by '#'
#Monitor appliance
component mon
{
    .category           = Monitoring
    .description        = "Monitoring appliance (v3.0.4-1)"
    volume boot         : class          , boot               , dev = /dev/hda , type = instantiable
    volume usr          : class          , shared             , ro , dev  = /dev/hdb      , type = common
        #User data volume declaration
    volume data         : mandatory      , dev        = /dev/hdc
    resource cpu        : min      = 0.05 , max        = 4          , dflt = 0.10
    resource mem        : min      = 288M , max        = 2G         , dflt = 288M
    resource bw         : min      = 1M   , max        = 500M       , dflt = 100M
    input mon           : protocol  = cce
    input web           : protocol  = http
    input aux           : protocol  = any
    output net           : gateway             , protocol = any
    interface default
    property title          : type     = string     , dflt     = ""
    property snmptraphost   : type        = string    , dflt    = ""
    property user           : type     = string     , dflt     = ""
    property password       : type     = string     , dflt     = ""
    property alarm_view     : type     = string     , dflt     = ""
}
```

Figure 3:
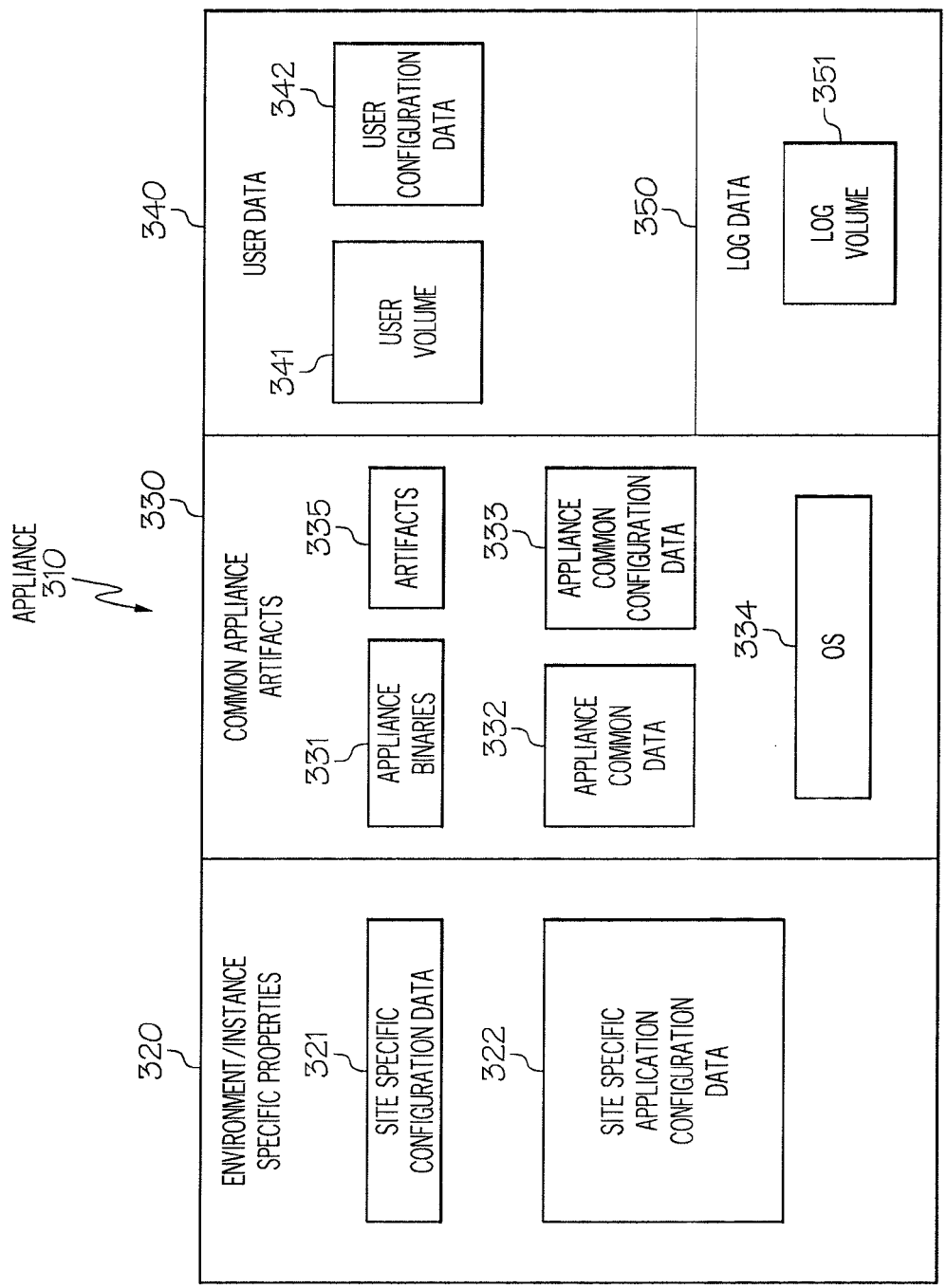
FIG. 3 illustrates an example logical view of an encapsulated appliance.

FIG. 3 illustrates an example logical view of an encapsulated appliance 310 according to particular embodiments of the present disclosure. Encapsulation of an appliance may refer to a view of the internal implementation of an object as being hidden behind public interfaces (like objects in object-oriented programming). It may also refer to the logical separation of environment/instance specific properties 320, common application artifacts 330, user data 340, and log data 350, as shown in FIG. 3.

Operational encapsulation of an application means that everything needed for operations and Tier 1 support is provided through standardized, external interfaces and that the internal implementation is insulated from the environment seen by operations and Tier 1 support. Operations may include distribution, configuration management, provisiontion, backup, or other functions related to the operation and/or management of applications and their associated data. The separation of persistent user data from essentially disposable application artifacts and disposable or readily-reproduced configuration information provides further benefits in kind.

Environment/instance specific properties 320 may include properties associated with appliance 310 that relate to the specific instance in a specific execution environment. For example, site-specific configuration properties 321 may include IP addresses, DNS names, or other network parameters that are related to other applications, the infrastructure management layer, other objects in the specific execution environment, or execution container. Likewise, site-specific application configuration data 322 may include, for example, location of volumes associated with the specific application instance in the specific execution environment or the fully-qualified domain name (FQDN) of a particular instance's SSL certificate. In some embodiments, site-specific application configuration data 322 may include configuration pertaining to replication, high-availability, or disaster recovery, for example, IP addresses of remote replicas, virtual IP addresses, or credentials. It may also include site-specific hosting properties, such as PCI or SSAE-16 compliance, SLAs, and the regional designations for restrictions on backup or information transfer. The distinction is that site-specific configuration data is common to all instances of a particular application in a particular site whereas site-specific application configuration data is specific to individual instances of an application.

Common appliance artifacts 330 may include properties or data associated with appliance 310 that relate to all application instances in all environments (a particular appliance 310 may be used by many different applications). For example, appliance binaries 331 may include any binary files that are necessary for execution of an appliance, regardless of the environment that the corresponding application instance is located. Similarly, as an example, appliance common data 332 may include data for consumption by appliance 310 during execution (not to be confused with user data 340) and appliance common configuration data 333 may include data for configuring application 310 for execution, each being necessary for appliance 310 to execute regardless of the execution environment in which the instance is located. In some embodiments, common data may include initialization information for persistence mechanisms, such as database seeding scripts, configuration or data relating to upgrading from one or more prior versions, localization and internationalization resource bundles, static data, such as end-user license agreements or document templates, or common configuration properties, such as Java Virtual Machine tuning parameters, heap, cache, or other memory-sizing parameters, or default debugging or logging levels. Operating system (OS) 334 may refer to the software that manages the interaction between appliance 310 and the hardware (be it physical or virtual) on which appliance 310 runs. In some embodiments, Operating System 334 may also include so-called user-land software commonly shipped with a given OS, such as shared libraries, shell interpreters, command-line executables, or services. In some embodiments, common appliance artifacts may include artifacts 335 which may include appliance runtime artifacts.

User data 340 may include any data associated with application 310 that is specific to a user of the application 310 on a persistent or session basis (as distinct from log data). User volume 341 may include data generated or stored by or for a user of application 310 during execution, while user configuration data 342 may include data associated a user-specific configuration of appliance 310 during execution. For example, in some embodiments, the backing stores for a database may be stored and treated as user data; on the other hand, for example, localization settings, license quantities, or feature-set enablement may be stored and treated as user configuration.

Log data 350 has similar properties to user data 340, except that log data 350 may include data generated by application 310 during execution that relates to a state of the application (i.e., not user information). Log data differs from user data in that users of the system do not know of its existence—if logs are lost otherwise malfunction, users will not notice Log data 350 may include a log volume 351 for storing logs associated with application 310. Log data is not required to be restored in order to preserve user available functionality of the application. In some embodiments, log data 350 may be accessed by the appliances of application 310 by mounting a network file system, such as NFS or CIFS, which, in some embodiments, may be served by a logging appliance within application 310.

In particular embodiments, user data 340 and log data 350 may be distinguished from common application artifacts 330 by the fact that the former is persistent while the latter is not. This allows for applications to be portable and disposable, such that they may be used as services with rapid, on-demand creation and destruction as necessary. It also allows for more efficient management of applications in an execution environment, as it prevents singleton applications from causing fragmentation that affects application behavior.

An example appliance descriptor is shown below:

```
#Comments denoted by '#'
#Appliance/class definition for MySQL appliance (database)
#This would be stored in the versioning schema
component app_mysqlr
    {
    .category                = "Database Appliances"
    .description             = "Redundant-capable mysql appliance. CA SaaS
modified.\n\n64 bit MYSQL database appliance with replication capabilities
based on mysql 5.5.8 (v2.0.3-1)"
    #Volumes
    volume boot              : class              , boot
, dev   = hda    , type = instantiable
    #In this case, certain common OS/System files are stored in a read-only
    #shared volume.
    volume usr               : class              , shared
, ro             , dev   = hdb    , type = common
    #User Data Volume for database backing store
    volume data              : mandatory          , dev    = hdc
    #_Optional_ User Data Volume for transaction logs -- used when
    #this appliance is configured for redundancy
    volume binlogs           : dev     = hdd
    resource cpu             : min     = 0.1      , max    = 16
, dflt = 0.4
    resource mem             : min     = 160M     , max    = 32G
, dflt = 512M
    resource bw              : min     = 1M       , max    = 2G
```

```
, dflt = 50M
    #Network interfaces
    input in              : protocol    = mysql
    input rin             : protocol    = any
    input ui              : protocol    = http
    output log            : protocol    = nfs
    output rout           : protocol    = any
    output mon            : protocol    = cce
    interface default
    #Boundary parameters
    property Environment          : type    = string
    property SoftwareVersion      : type    = string
    property DomainSuffix         : type    = string
    property DB_username          : type    = string
    property DB_password          : type    = string
    property auto_create          : type    = integer    , values    = 1|0
, dflt = 1
    property error_log_filename   : type    = string     , dflt      = " "
    property error_log_level      : type    = string     , values    = error|warn
, dflt = error
    property timezone             : type    = string     , dflt      = " "
    property server_id            : type    = integer    , values    =
1|2|3|4|5|6|7|8|9|10                          , dflt = 1
    property rpl_mode             : type    = string     , values    =
none|master|slave|master_and_slave            , dflt = none
    property web_pwd              : type    = string     , dflt      = " "
    }
```

Figure 4A:
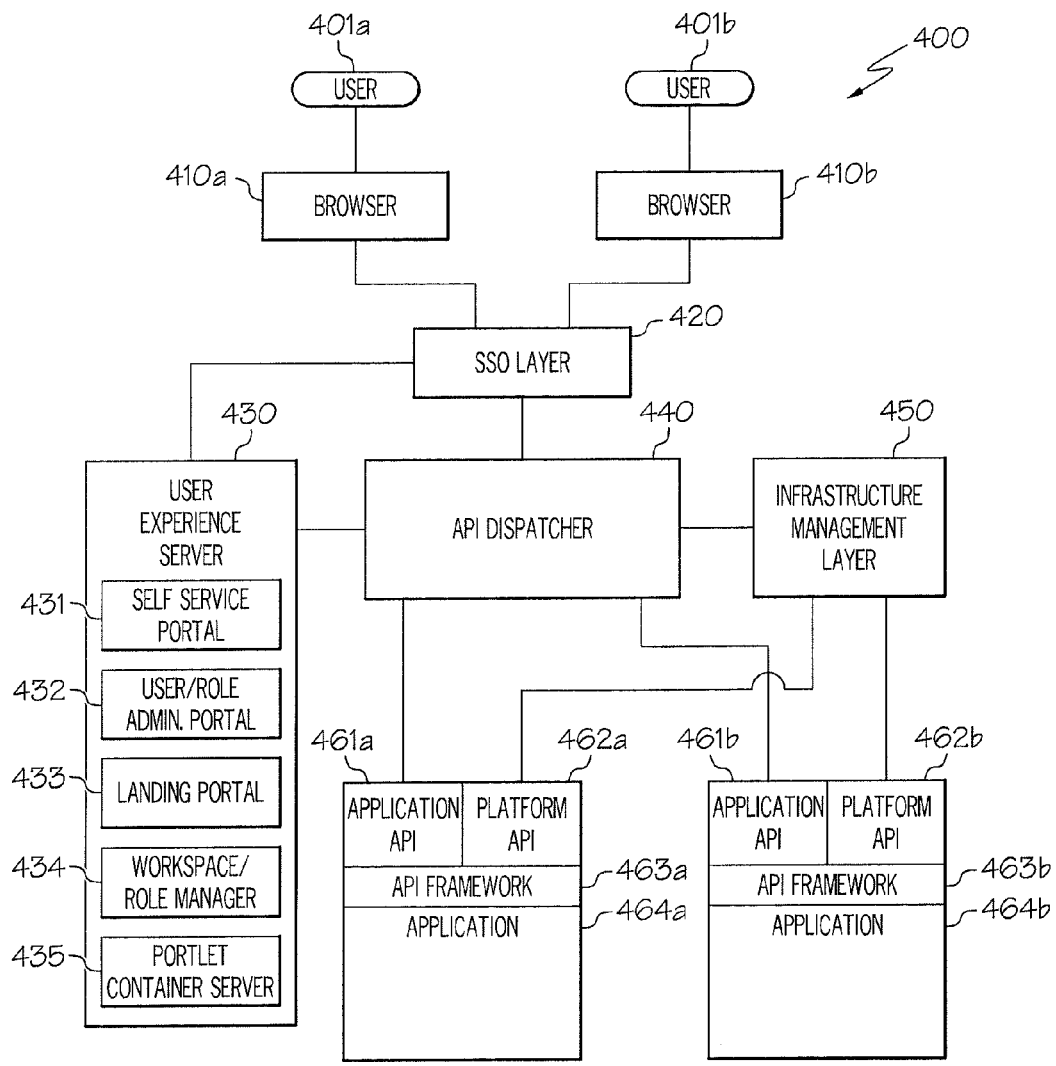
FIG. 4A illustrates an example SaaS architecture.

FIG. 4A illustrates an example SaaS architecture 400 according to particular embodiments of the present disclosure. SaaS architecture 400 includes users 401*a-b* accessing one or more applications and services through browser 410 (e.g., user 401*a* can use a separate browser 410 than user 401*b*). Browser 410 may interact with single sign on (SSO) layer 420, user experience layer 430, and API dispatcher 440.

SSO server 420 may be a central security layer that may manage security tokenuser authentication, issue, validate, and manage expiration for s for users 401. In particular embodiments, the communications between SSO server 420 and browser 410 may be encrypted, for example, by means of SSL or TLSIn some embodiments, encrypted communication between browser 410 and the SSO server 420 may be terminated by a device, such as a load balancer or firewall upstream of the SSO server 420. SSO server 420 may be implemented, for example, using software such as SiteMinder provided by CA Technologies.

API dispatcher 440 may be a layer that exposes all underlying functionality as "headless" functionality. This could be used by a web browser, a mobile computing and/or communication device (e.g., iPhone/iPad/Android), RSS (Rich Site Summary), or other suitable user interface. API dispatcher 440 may be operable to route requests to the proper destination application instances 464 via application APIs 461. For example, API dispatcher 440 may expose methods to query application instances 464, list instances for a particular tenant, retrieve detailed information about instances, or other information related to the application instance. API framework 463 may then be operable to intercept API calls in order to standardize calls to application instance 464. The authorization, caching pagination, sorting, filtering, and other functions will be used the same across all features and will be applied here. In this embodiment, control of how the workspace is rendered is external to the application, and the application only provides APIs to support the user interaction. This approach has significant impacts that enable runtime integration. API dispatcher 440 can also route traditional browser non-API requests to an application instance. In this application embodiment the externally defined workspace is a trivial pipe from the browser to the application, where the application itself controls rendering. Thus the rendering of two applications cannot be combined, nor can the data content of application APIs interact without hard-wired assumptions that break encapsulation. The data that describes the application's operation indicates whether each application instance provides an externalized UI using APIs, a traditional application controlled UI, or some combination of the two. In some embodiments, API dispatcher 440 exposes federated query (queries spanning a plurality applications), searching, aggregation, and other functions, which functions may in some embodiments, be implemented by API dispatcher 440 or, in other embodiments, forwarded to the implementing services by API dispatcher 440.

Figure 4B:
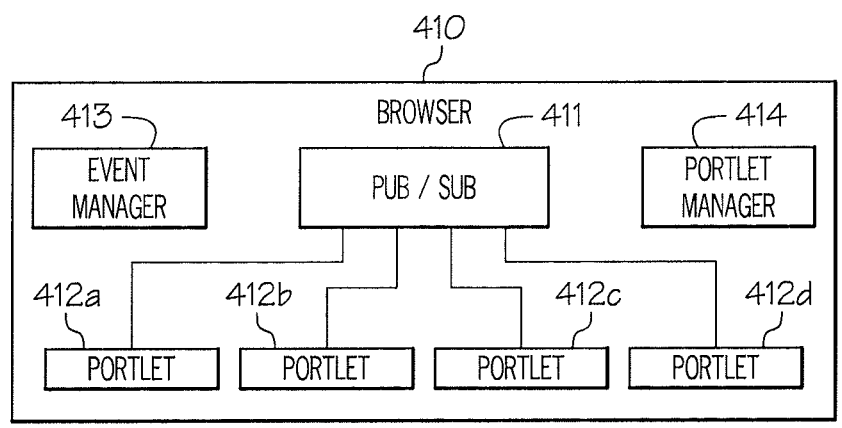
FIG. 4B illustrates an example browser for interacting with SaaS architecture of FIG. 4A according to particular embodiments of the present disclosure.
Figure 4C:
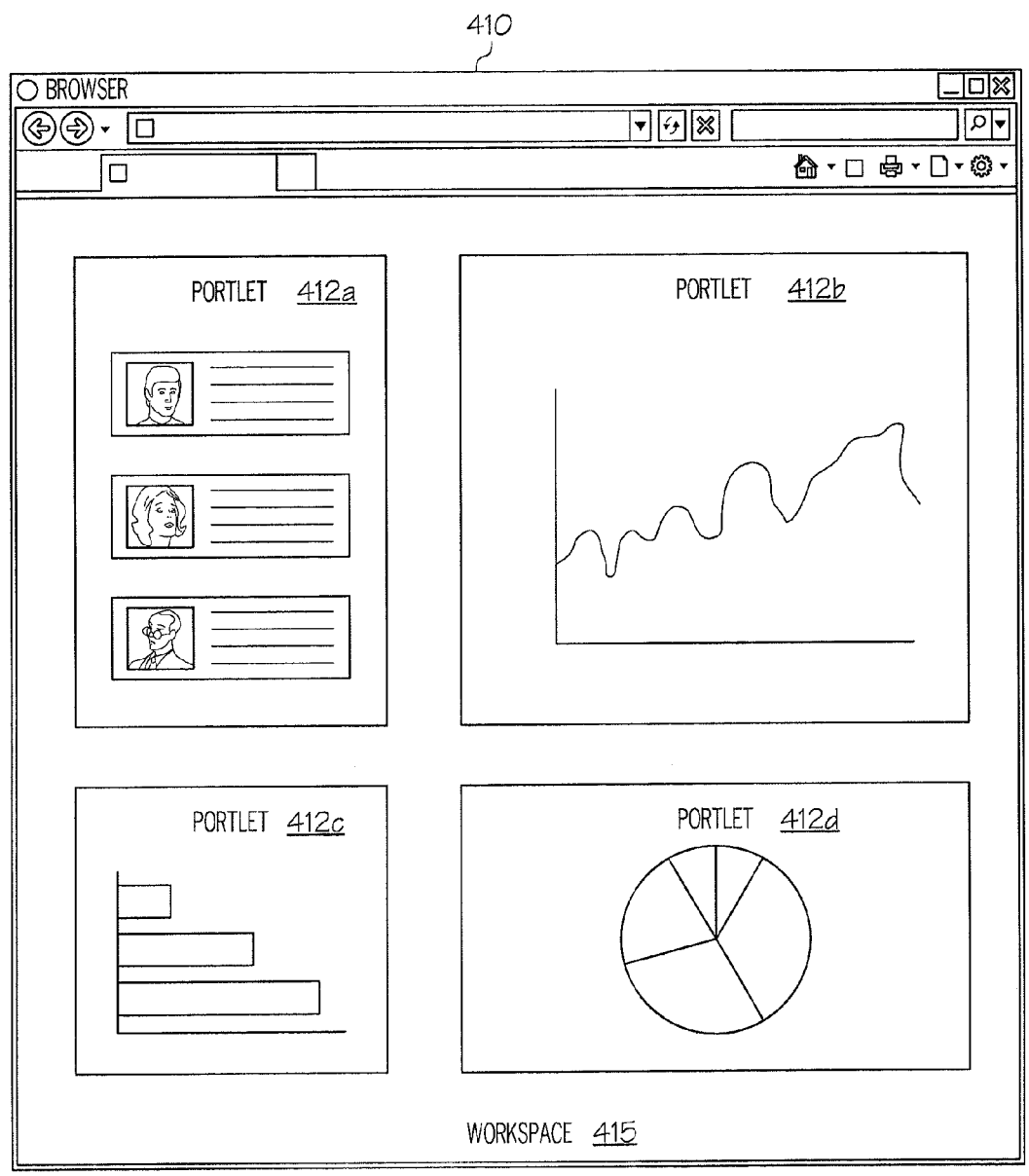
FIG. 4C illustrates an example user interface of the browser of FIG. 4B.

FIG. 4B illustrates an example browser 410 for interacting with SaaS architecture 400 of FIG. 4A according to particular embodiments of the present disclosure. Browser 410 may be implemented through any suitable application for interacting with components of SaaS architecture 400, and may include any suitable web browser or RSS client. Browser 410 may include a publication/subscription service 411 operable to receive event notifications associated with applications 464 through event manager and process requests from users related to one or more components of SaaS architecture 400 through portlet manager 414. In particular embodiments, the event service is aware of and dispatches based on RESTful and object semantics, and is implemented in Javascript code uploaded and persisting for the entire user session. An example user interface of browser 410 according to particular embodiments of the present disclosure is illustrated in FIG. 4C.

Browser 410 may interact directly with an application, where a single application provides direct instructions on how to render portals in the browser. In this case each application defines its own workspace. This is the typical case seen in industry today. The present disclosure includes another mode where the rendering instructions for multiple applications are managed by a separately deployed portlet container server 435, which is part of the User Experience Server 430. In this mechanism one or more portlets 412 that support tasks performed by the users 401 from multiple independently developed applications. Portlets 412 can be delivered to Browser 410 within a single workspace. Portlets 412 may be implemented, in some embodiments, using standard Java portlets and portlet containers (JSR-286), and may be displayed in the user interface of browser 410 as shown in FIG. 4C. Portlets 412 make API calls that are dispatched to their intended applications, or to a data federation service that can interact and aggregate across multiple applications. In certain embodiments, portlets 412 may be used to display information to users regarding one or more application instances 464, such as usage or capacity metrics.

Particular embodiments of the present disclosure uses the browser resident pub/sub event service 411 to enable integration between portlets from different application sources, and accessing data from separate applications without requiring the applications to be aware of this integration. For example, if one portlet is updated to display details a new object, it could publish that the owner of the object (another object) could also be displayed. If a portlet from another application has subscribed to display this data, the portlet would then receive the event, search for and subsequently display the details about the original object's owner. No application side implementation is required to enable this integration.

User experience server 430 provides a layer that customers may access via browser 410. This layer will have access to underlying SaaS applications and additional services that will give added value to the exposed SaaS application features. Through user experience server 430, one or more of the following concepts/services may be implemented: roles, workspaces, tasks, portlet/workspace rendering, containers, dynamic ad-hoc rendering, and object views.

Roles are assigned to users which control access to various capabilities of the system. Roles will control access to workspaces, tasks and portlets. A user can have multiple roles assigned, and in that case would have access to the full set of capabilities associated with all the assigned roles. Some example roles may include, for example, Service Desk Analyst, Service Desk Manager, or Tenant Administrator.

A workspace 415 may include user interface pages (and may be implemented, for example, as portals served by portlet containers, such as Liferay) and may be composed of a number of portlets, as shown in FIG. 4C. Each portlet may address one or more applications or capabilities such that the workspace 415 may be functional composition of many underlying capabilities exposed by a plurality of application instances.

Each workspace may be optimized to allow a user to perform one or more Tasks in an efficient manner. Being optimized for efficiency means that to perform a certain task, the user does not need to navigate through multiple menus, tabs, overlays, and/or pages. Those tasks, for which the workspace is optimized, should be very easy to access from within the workspace. A user can have multiple workspaces open at the same time and can switch between them. New workspaces are generally opened by user-initiated actions that open a new workspace. An example would be clicking a 'See More . . . ' link in a dashboard workspace that displays 'Top' or 'Recent' lists (e.g. clicking on 'Recent Tickets' would take you to a workspace that allows you to browse Tickets with advanced filtering capabilities. Another way to open a new workspace is when drilling down to see more details about an object. An example of this would be when clicking on a Contact's name could bring up a small in-line summary view with basic contact information. That view would have a 'See More Details . . . ' link which will open a new workspace where you can see the more details about that Contact. Portlets may be standard JSR-286 portlets which are combined to form workspaces. Many of the portlets are used in more than one workspace. If a portlet allow the user to perform multiple tasks, the portlet should check if the user has access to those tasks before making the relevant UI elements available/enabled.

In one implementation of a workspace, the workspace is rendered, it is rendered in an IFrame. Each workspace will be initialized with a root object instance. While the portlets in the workspace will likely need to display information about additional objects, all of those objects will usually be referenced from the object used to initialize the workspace. Sometimes the root object will not be intuitive at first sight. For example, in the example above, while the workspace is focused on Tickets, it is actually initialized with a User object. The reason is that the workspace shows all of the tickets assigned to a user. From there, the user can drill down into individual tickets, but the overall context for workspace is the user.

In another implantation of a workspace, the workspace includes all portlets available to a user session based on the access rights of the user for that session. In some situations, the portlets available to a user are specific to a single tenant context, or are limited based on the authentication level of the user. Independent of source, these portlets interact through the event manager 413.

Tasks represent high-level actions that are associated with a role. As an example, for the Service Desk Analyst role, associated tasks can include things like View Tickets, Update Tickets, and Escalate Tickets Service Desk Manager role would also have access to tasks like View Service Desk Reports, and Create/Update Ticket Categories. Tasks and workspaces have a many-to-many relationship. For some tasks, user needs access to multiple workspaces in order to accomplish a given task (e.g. a wizard-like task that walks you through multiple workspaces). Likewise, some workspaces allow a user to accomplish multiple tasks. This relationship between tasks and workspaces is what defines which workspaces are available for each role. As a single workspace can be associated with multiple tasks, the workspace (or rather portlets in a workspace) might expose different actions based on which tasks the user has access to. As an example, the 'Ticket Details' workspace would have many tasks associated with it (View Ticket, Add Comment to Ticket, Change Ticket Priority, Escalate Ticket, Assign Ticket to Another User, or Close Ticket). Some of these tasks would be available to Level 1 Analyst role, additional tasks would be available to Level 2 Analyst, and all the tasks would be available to Service Desk Manager. The workspace (and the portlets inside it) would check which tasks the user has access to, and modify/disable/hide user interface component accordingly.

Object views may refer to lookup tables that map [Object Type, View Name, Tenant Id] to [View Type, View Implementation]. Each object view may be defined by one or more of the following properties: object type, view name, tenant ID, view type, and view implementation. The object type used to initialize the view of the object. In our previous examples, this would be 'User'. A view name will look up views by the object type and this name. In the previous example, this would be 'Assigned Tickets.' By default, seed data for Object Views will have Tenant Id set to null, meaning that the value applies to all tenants. If a tenant overrides this value, they will have an entry that specifies an implementation of an Object View. This can be either 'Portlet' or 'Workspace.' The view implementation uniquely identifies either the portlet or the workspace that implements the view.

User experience server 430 may include a self-service portal 431, a user/role admin portal 432, a landing portal 433, and a workspace/role manager 434 according to particular embodiments of the present disclosure. Self-service portal 431 may allow a user to manage their own profile. User/role admin portal 432 may provide a user interface for adding or managing user identities, as well as associating and provisioning generic access rights to applications, as well as associate and provision application-idiosyncratic roles and rights. Portal 432 may also associate and request provisioning fulfillment of application resources for tenants, as well as enable users to have membership in zero, one, or more tenants. User roles and security groups may be managed for users on a per-tenant basis. Managing user identities may include a tenant or organization with rights to manage the identity that is separate from any tenant membership that provides access rights to applications. Landing portal 433 may provide the user an interface to connect to one or more workspaces, to select from multiple workspaces. If the user is a member of more than one tenant, the user may select the tenant context for the current session. Workspace/role manager 434 may determine which workspaces are available to a user based on the user's tenancy and roles. look at the collection of roles. The workspace manager may also keep track of customized workspaces on behalf of the tenant, user, or other group. The workspace manager 434 may also enable multiple users to share synchronized access to a workspace so that they may remortely collaborate. In this case two users 401a and 401b are accessing the workspace from distinct network-separated browser instances, each containing separate browser-resident event managers 413. The event managers 413 are configured to share local events between the browsers used by 401a and 401b by routing them through the dispatcher 440.

Infrastructure management layer 450 may have the same functionality as that described above with respect to infrastructure management layer 150 of FIG. 1. In particular embodiments, infrastrtucture management layer 450 may communicate with application instances 464 via platform APIs 462 and API framework 463, which may be operable to intercept API calls from platform API 462 in order to standardize calls to application instance 464. In some embodiments, infrastructure management layer 450 may implement an asynchronous bulk request mechanism for use by the API Dispatcher 440. This may be used, for example, to prime the cache to enable a restarted API Dispatcher to route requests to. For example, the correct IP address using request content and user/tenant information. The query would return a list of all (tenant_id, capability_id, DMZ IP) mappings managed by infrastructure management layer 450. A similar Dispatch function exists on the separate management network, if implemented.

Figure 5:
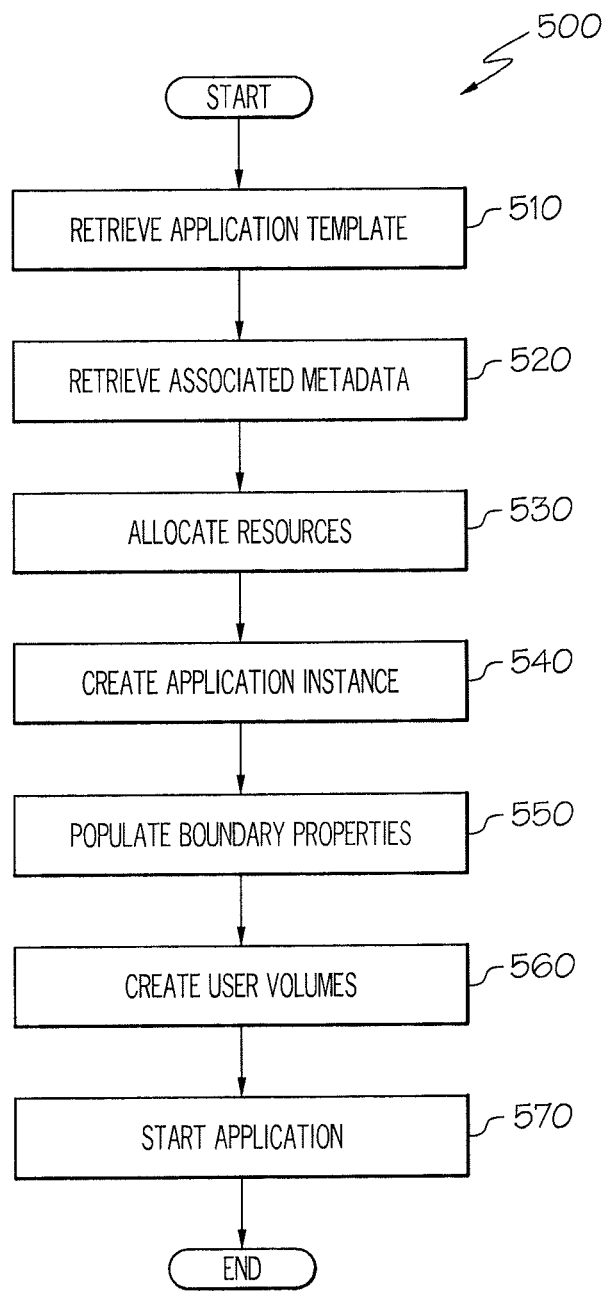
FIG. 5 illustrates an example method for instantiating an application.

FIG. 5 illustrates an example method 500 for instantiating an application according to particular embodiments of the present disclosure. The method begins at step 510, where an application template is retrieved. According to the template, associated metadata is retrieved at step 520. The application template may include an indication of which appliance images comprise the application, and where such images may be located (e.g., an appliance image repository). The metadata may include, for example, information for generating a first appliance based on first appliance information (e.g. an appliance image), information for generating a second appliance based on second appliance information (e.g. a different appliance image), information for configuring communication between the first appliance and the second appliance, and one or more identifiers indicating user volumes for use with the application instance. In some embodiments, each of these steps may be done by an infrastructure management layer (e.g., infrastructure management layer 150 of FIG. 1) in response to a request by an administrator to create a new application instance, for example.

Next, at step 530, resources are assigned or allocated to the instance. Resources may contain configuration parameters corresponding to a plurality of the application's boundary parameters. In some embodiments, the parameters may be based on or associated with the metadata retrieved. In other embodiments, some configuration parameters may be provided, for example, to the infrastructure management layer by an administrator initiating a request. In most embodiments, all other resources are assigned by the infrastructure management layer itself. Examples of configuration parameters include an application's name, the names of services the application needs to access, and the environment the application is located within. Examples of other sorts of resources include: IP addresses, license keys, volumes, and physical resources within execution containers.

At step 540, an application instance is generated based on the received application template and metadata. The application instance's boundary properties are then populated at step 550 the application instance according to the metadata and the resources allocated at step 530. During this step, appliances within the application inherit (or "self-seed") any necessary properties and/or parameters from the configured application. At step 560, user data volumes are created based on the configuration parameters and metadata, and the volumes are associated with the application and its appliances. Finally, the application is started at step 570.

In some embodiments, this entire sequence of steps will run to completion. In other embodiments, the sequence may pause—for example, to await the replenishment of a resource pool, such as an IP address pool for some network. In some embodiments, the application may be fully-instantiated (up to and including step 560) but not immediately started.

Figure 6:
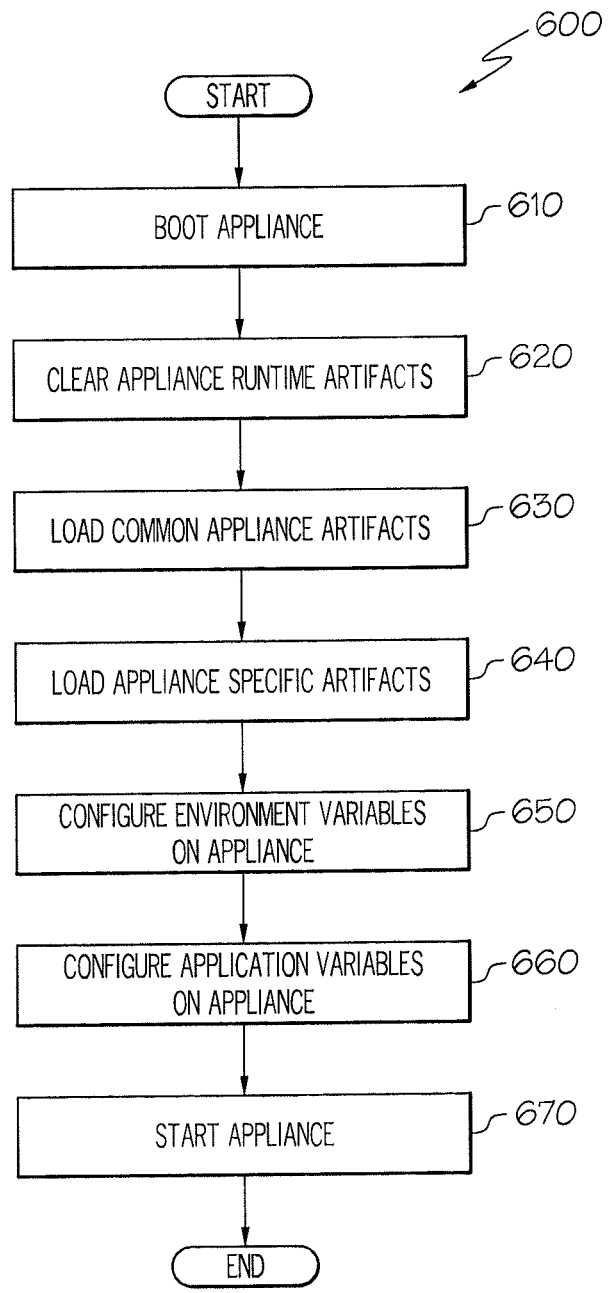
FIG. 6 illustrates an example method for initializing and bootstrapping an appliance.

FIG. 6 illustrates an example method for initializing and bootstrapping an appliance according to particular embodiments of the present disclosure. In particular embodiments, the entire bootstrap operation changes the generalized appliance into an executable virtual machine instance that is integral to its larger application context (recall that the same appliance image may be used in many different applications). This can involve configuring the virtual machine operating system consistently into its virtualized context. Data-driven configuration of the application component(s) contained therein is included. Every time the virtual machine is started, the bootstrap repeats to assist in configuring whole applications, and interwork into a standard management infrastructure. The bootstrap process of method 600 may ensure that the appliance is cleanly set up each time it boots.

Referring to FIG. 2 as an example, the bootstrap process of FIG. 6 can alter appliance volume 222 based on the contents in proprietary volume 223. User volumes 230 may be used only at runtime and is the only location for persisting user configuration or user data when the application is temporarily stopped. All logging is externalized (e.g., to log volume 240). Any changes to appliance volume 222 or boot volume 221 are non-durable.

In some embodiments, one or more of volumes 221, 223, and volumes other than volume 222 and 230 may be configured as read-only volumes. In some embodiments, read-only volumes do not require cloning or duplication for each appliance instance—saving storage space and time. The use of read-only volumes in this context provides additional measures of security and consistency because runtime artifacts on such read-only volumes cannot be compromised and any runtime artifacts derived therefrom can be reconstituted from known-good sources by simply restarting the appliance.

The method begins at step 610, where the boot process for the appliance is started and followed to a point where appliance-specific code is invoked. At step 620, the destination for runtime artifacts for the appliance is cleared. In most embodiments, the "clearing" action is implemented by a recursive deletion of the contents of the respective volume. This guarantees that each boot cycle gets a clean copy of the runtime artifacts from an infrastructure management layer, for example, and eliminates any vestigial remnants from prior executions. In certain embodiments, the "clearing" action in step 620 may take the form of reverting the respective appliance volume back to a snapshot (original blank state); such reversion may be implemented external to the appliance before its runtime execution. For example, if the execution container were similar to Amazon EC2, so-called in-memory disks, which are guaranteed not to persist across boot cycles, could be used, affecting the "clearing" action automatically.

Next, at steps 630 and 640, common appliance artifacts and application-specific artifacts are loaded, respectively. In some embodiments, these artifacts may be loaded from an infrastructure management layer charged with managing the applications and their appliances—or from an external content management facility. In other embodiments, the artifacts may be loaded from a separate server, such as a web server or database server charged with storing a most current version of the artifacts. In yet other embodiments, the artifacts may be loaded from a separate server, such as a web server, the version of which artifacts being determined by the value(s) of one or more boundary parameters; this embodiment is particularly well-suited to development environments.

In certain embodiments, the loaded artifacts may be stored on a read-only repository volume and copied into a temporary location for use by the application. This mechanism guarantees that every instance of a particular appliance always loads exactly the same software on each boot cycle. Because the repository is read-only, there is no way for the appliance to modify content. In addition, this mechanism also provides enhanced security, as the application artifacts delivered via the repository cannot be changed. If they were changed during runtime, such changes will be lost when the appliance is restarted (because of application encapsulation as described above). The repository concept provides a clear mechanism to combine a "generic" appliance with a particular software release. Thus, a common, known-good base appliance can be re-used for many software releases. This enables greater release-to-release consistency and simplifies the appliance release process. Further, during this step, a number of environment variables are exported, including, among other things, the locations of the appliance- and application-specific artifacts passed in, enabling relocation of these files without modifying any downstream software.

In particular embodiments, the remainder of the startup process of 600 and as the appliance-specific startup initiated in 670 may be the same regardless of the source of the runtime artifacts. A fortunate consequence is that many artifact sources can be used during research and development without other changes to the appliance itself; the only difference, in all cases, is the source of the artifacts.

At steps 650 and 660, environment variables and application variables on the appliance are configured. which, in the present embodiment, is the means by which certain information is provided to the appliance at runtime Appliances having application-specific content may contain an application-provided startup script which must service commands to configure the appliance, set up persistence objects (initialize or upgrade databases, for example), and start or stop the application. Critically, any dynamic application configuration is generated during this step. The appliance is thus empowered to derive its runtime configuration from its environment, from scratch, on each startup. This ensures consistency and generality. Finally, at step 670, the appliance starts with the newly configured variables.

An example script for performing the bootstrap method of FIG. 6 is shown below:

```
#!/bin/bash
################################################################

# bootstrap.sh -- bootstrapping code for appliances.

# Fetches environment information from applogic.sh; using this information,
# fetches the appropriate appliance-automation scripts.

# Usage: bootstrap.sh {start|stop|...}

# Appliance Installation:

#       # mv /etc/sysconfig/applogic_appliance /etc/sysconfig/applogic_appliance.orig
#       # cp -a bootstrap.sh /etc/sysconfig/ca_appliance_bootstrap
#       # chmod 755 /etc/sysconfig/ca_appliance_bootstrap
#       # ln -sf /etc/sysconfig/ca_appliance_bootstrap /etc/sysconfig/applogic_appliance

# CA Technologies Confidential and Proprietary.
Copyright (c) 2011, 2012 by CA Technologies. All Rights Reserved.
################################################################

function bailOnError( )
{
   _error "$*"
}
function _error( )
{
  if $DEV_MODE
  then
     echo $* 1>&2
     exit -1
```

-continued

```
    else
        logger ${ALARM_LEVEL} -i -s -- "$*"
        vme id=start_failed msg="$*" severity=fatal 2>&1 &>/dev/null
        exit -1
    fi
}
function_log( )
{
    if $DEV_MODE
    then
        echo $*
    else
        logger -i -s -- "$*"
        vme id=log severity=info msg="$*" 2>&1 &>/dev/null
    fi
}
function emptyDir( )
{
    local dir=${1?"ERROR: Must specify directory name"}
    if [ "$(/bin/ls/ -A $dir)" ]
    then
        return 1
    else
        return 0
    fi
}
# Multi-platform support
if which logger &>/dev/null
then
    logger -i -- "Using `which logger`"
else
    function logger ( )
    {
        msg=$*
        echo -e `date + "%Y/%m/%d %H:%M:%S"` " " $msg | tee -a /var/log/messages >&2
    }
    logger "Using homegrown logger"
fi
#Determine OS Type
declare -x IS_LINUX
declare -x IS_CYGWIN
if [ -z "$OSTYPE" ]
then
    os=`uname -o|tr '[:upper:]' '[:lower:]'`
    if [[ $os =~ linux]]
    then
        OSTYPE=linux
    elif [[ $os =~ cygwin ]]
    then
        OSTYPE=cygwin
    else
        bailOnError "Cannot determine OSTYPE from uname -o=${os}"
    fi
fi
os=`echo $OSTYPE | tr '[:upper:]' '[:lower:]'`
if [[ $os =~ linux]]
then
    IS_LINUX=true
    IS_CYGWIN=false
elif [[ $os =~ cygwin ]]
then
    IS_LINUX=false
    IS_CYGWIN=true
else
    bailOnError "Cannot identify os type from OSTYPE=${OSTYPE}"
fi
unset os
export IS_LINUX IS_CYGWIN
################################################################################
#Definitions of important locations
################################################################################
APPLIANCE_HOME="/appliance/"
REPO_HOME="/usr/saas/repo"
REPO_COMMON="${REPO_HOME}/common"
REPO_NATIVE="${REPO_HOME}/native"
REPO_APP="${REPO_HOME}/application"
APPLIANCE_ARTIFACTS="common_artifacts/appliance/"
APP_ARTIFACTS="${APPLIANCE_HOME}/app_artifacts"
```

```
NATIVE_ARTIFACTS="${APPLIANCE_HOME}/native"
ALARM_LEVEL="-p local3.crit"
#Setting DEV MODE to true will disable calls to the VME and syslog
DEV_MODE=${DEV_MODE-false}
if $DEV_MODE
then
    echo "Development mode enabled: will not call vme for errors"
fi
################################################################
#Import boundary values from execution container
################################################################
if $IS_LINUX
then
    if [ -e /etc/applogic.sh ]
    then
        source /etc/applogic.sh
    else
        bailOnError "ERROR: unable to locate applogic.sh"
    fi
elif $IS_CYGWIN
then
    if [ -e /var/run/applogic/appliance.sh ]
    then
        source /var/run/applogic/appliance.sh
    else
        bailOnError "Unable to locate applogic's appliance.sh (cygwin)"
    fi
fi
_log "Found applogic.sh"
################################################################
# Consume requisite boundary parameters
################################################################
ENV_NAME= echo "${_Environment}" | tr '[:lower:]' '[:upper:]'
SOFTWARE_VERSION= echo "${_SoftwareVersion}" | tr '[:lower:]' '[:upper:]'
DOMAIN_SUFFIX=${DomainSuffix}
#Chop off '.' at beginning of name
CLASS_NAME= echo ${_COMP_CLASS} | sed s/.*\.//g'
if [ -z "$ENV_NAME" ]
then
    bailOnError "ERROR: Required boundary parameter Environment is not set
or empty"
elif [ -z "$SOFTWARE_VERSION" ]
then
    bailOnError "ERROR: Required boundary parameter SoftwareVersion is not
set or empty"
elif [ -z DOMAIN SUFFIX ]
then
    bailOnError "ERROR: Required boundary parameter DomainSuffix is not set
or empty"
fi
if [ -z "$CLASS_NAME" ]
then
    bailOnError "ERROR: Unable to parse class name from applogic.sh"
fi
################################################################
# Check for the existence of the "dev mode" file, which allows appliances
# to use the filer. The non-existence of this file disables filer-based
bootstrapping
################################################################
SAAS_DEV_MODE=false
if [ -e /etc/_SAAS_DEV_MODE ]
then
    SAAS_DEV_MODE=true
fi
################################################################

# We are an init script after all. . . so handle the cumpolsory start and stop
# commands.

# Note that artifacts are pulled only on start. Stop simply calls
appliance.sh stop

#Any other command generates an error.
################################################################

case $@ in
    start)
        # Handle baked/static case -- this is the production use case
```

-continued

```
    if [[ "$SOFTWARE VERSION" == "BAKED" || "$SOFTWARE_VERSION" == "STATIC"
]]
    then
        # Clean up APPLIANCE HOME -- the scratch area for staging
            # runtime artifacts
        if [ -d "$APPLIANCE HOME" ]
        then
            rm -rf "${APPLIANCE HOME}"/*
        else
            mkdir "$APPLIANCE HOME"
            chown root:root "$APPLIANCE HOME"
            chmod 777 "$APPLIANCE HOME"
        fi
        if ! [ -d "$APPLIANCE HOME" ]
        then
            bailOnError "Unable to locate or create
APPLIANCE_HOME=${APPLIANCE HOME}"
        fi
        # Check for repository.
        if ! [ -d "${REPO_HOME}" ]
        then
            bailOnError "ERROR: SoftwareVersion ${SOFTWARE_VERSION}
specified but cannot find repo directory ${REPO_HOME}"
        fi
        # Check for common artifacts and appliance.sh -- minimum required
for startup
        if ! [ -d $ {REPO_COMMON} ]
        then
            bailOnError "ERROR: Common artifacts repo ${REPO COMMON}
does not exist"
        elif ! [ -e "${REPO_COMMON}/appliance.sh" ]
        then
            bailOnError "ERROR: Cannot locate
${REPO_COMMON}/appliance.sh"
        fi
        cp -a "${REPO_COMMON}"/* "${APPLIANCE_HOME}" || bailOnError
"ERROR: Copy of common artifacts failed"
        _log "Common artifacts pulled from repo"
        # Check for native artifacts and, if they exist, copy them into
place
        if [ -d "${REPO NATIVE}" ] && ! emptyDir "${REPO_NATIVE}"
        then
            mkdir "${NATIVE_ARTIFACTS}"
            cp -a "${REPO_NATIVE}"/* "${NATIVE_ARTIFACTS}"
            if [[ $? != 0 ]]
            then
bailOnError "ERROR: problem while copying native
artifacts"
            fi
        else
            _log "No native artifacts found in repo"
        fi
        # Check for application artifacts and, if they exist, copy them
into place
        if [ -d "${REPO APP}" ] && ! emptyDir "${REPO_APP}"
        then
            mkdir "${APP_ARTIFACTS}"
            cp -a "${REPO APP}/"* "${APP ARTIFACTS}"
            if [[ $? != 0 ]]
            then
bailOnError "ERROR: problem while copying application
artifacts"
            fi
        fi
        # Make sure all shell scripts are executable and, god help us,
use unix end-of-lines
        find -L /appliance -type f -name \*.sh |xargs dos2unix
        find -L /appliance -type f -name \*.sh |xargs chmod +x
        _log "Repo clone completed"
    # Non-baked/non-static and SAAS_DEV_MODE is enabled
#This is for development use
    elif $SAAS_DEV_MODE
    then
        #locate filer
        #NB: we assume that the system is pointed at the appropriate
        #DNS server.
        #Filer is identified by a canonical hostname computed
```

```
#from the boundary/environment properties
    $IS_LINUX && FILER=`dig filer.admin.${DOMAIN_SUFFIX} +short|tail
-1`
    $IS_CYGWIN && FILER=`/usr/local/bin/dig.sh
filer.admin.${DOMAIN_SUFFIX} +short|tail -1`
    if [ -z "$FILER" ]
    then
        bailOnError "ERROR: Unable to resolve my filer"
    fi
    _log "Found filer: ${FILER}"
    SCRATCH=`mktemp -d -t bootstrap.XXXXXXX`
    #Fetch automation gear
    cd ${SCRATCH}
    #Recursive wget; do not save index; do not fetch parent dirs;
    #only fetch contents of specific dir; do not generate dir.
structure
    wget --quiet -r -R index.html* --no-parent -11 -nd
http://${FILER}/${APPLIANCE_ARTIFACTS}/
    #Check that we at least got appliance.sh
    if ! [ -e ${SCRATCH}/appliance.sh ]
    then
        bailOnError "ERROR: Could not find appliance.sh in
downlaod. I can't proceed."
    fi
    _log "Got appliance files"
    #OK, it looks sane. Copy files to appliance directory
    cp -a ${SCRATCH}/* ${APPLIANCE_HOME}/
    chmod +x ${APPLIANCE_HOME}/*.sh
    dos2unix ${APPLIANCE_HOME}/*.sh
    #Clean up temp directory
    cd /tmp
    rm -rf ${SCRATCH}
    #Fetch application software, if applicable; allows for
bootstrapping of boxes
    #that don't need to download artifacts :)
    if ! [ ${SOFTWARE_VERSION} = "NONE" ]
    then
        #Prepare to fetch application artifacts
        mkdir -p ${APP_ARTIFACTS}
        rm -rf ${APP_ARTIFACTS}/*
        cd ${APP_ARTIFACTS}
        #Fetch application artifacts
        #wget --quiet -r -R index.thml --no-parent --cut-dirs=3 -nH
http://${FILER}/app artifacts/${SOFTWARE_VERSION}/${CLASS_NAME}/
        if ! wget --quiet -r -R index.html* --no-parent --cut-
dirs=3 -nH http://${FILER}/app_artifacts/${SOFTWARE_VERSION}/${CLASS_NAME}/
        then
bailOnError "ERROR: could not/did not download any
application artifacts from
http://${FILER}/app_artifacts/${SOFTWARE_VERSION}/${CLASS_NAME}/"
        fi
        chmod +x *.sh
        dos2unix *.sh
        _log "Got application files"
    fi
    #Handle native artifacts in the case where someone is swapping
between BAKED and filer modes
    if [ -d "${REPO_NATIVE}" ] && ! emptyDir "${REPO_NATIVE}"
    then
        mkdir "${NATIVE_ARTIFACTS}"
        cp -a "${REPO_NATIVE}/"* "${NATIVE ARTIFACTS}"
        if [[ $? != 0 ]]
        then
bailOnError "ERROR: problem while copying native
artifacts"
        fi
    else
        _log "No native artifacts found in repo"
    fi
else
    #We get here iff the SoftwareVersion is not BAKED or STATIC
    #AND the magic /etc/_SAAS_DEV_MODE file does not exist. This
means that we are on a baked appliance
    #that someone is trying to run off a filer, which is not
permitted.
        bailOnError "SoftwareVersion ${SOFTWARE_VERSION} is not permitted
```

```
for released applications"
fi
    export ENV_NAME SOFTWARE_VERSION DOMAIN_SUFFIX APPLIANCE_HOME \
    NATIVE_ARTIFACTS CLASS_NAME APP_ARTIFACTS
    _log "Done with bootstrap; about to call appliance.sh"
    # Invoke appliance.sh -- end of the bootstrap process for us!
    ${APPLIANCE HOME}/appliance.sh $@
    rc=$?
    if [[ $rc != 0 ]]
    then
        bailOnError "ERROR: appliance.sh returned error status."
    else
        vme id=started_ok msg="CA Appliance Bootstrap completed" 2>&1
&>/dev/null
        _log "Bootstrap completed successfully"
    fi
```

In a specific example, at some point in the operating system startup process, a first script may be invoked. The first script then fetches certain configuration files from the execution container via HTTP. The HTTP server itself is the same as the DHCP server and is available to the appliance only for a brief time. Using this configuration information, the first script configures local storage, network interfaces, and other parts of the system. It also extracts the appliance's boundary parameters into canonically-named files for consumption by subsequent scripts. Two daemons are launched; these maintain communication with the execution container and the hypervisor.

An example of the first script is shown below:

```
#!/bin/bash
################################################################

# appliance.sh -- top-level CA SaaS appliance script

# invoked by bootstrap procedure

# parameters: { start, stop, restart }
# CA Technologies Confidential and Proprietary.
Copyright (c) 2011, 2012 by CA Technologies. All Rights Reserved.
################################################################

function copy_initlog( )
{
    if [ -z $LOGGING HOME ]
    then
        if ! [ -d /logs/ hostname ]
        then
            mkdir -p /logs/ hostname
        fi
        export LOGGING HOME="/logs/ hostname "
    fi
    datestamp= date +%Y%m%d_%H%M%S
    cp --preserve=mode,timestamps /tmp/applogic init.log
${LOGGING_HOME}/applogic_init.${datestamp}.log
}
trap copy_initlog EXIT
# Source in common routines
if ! [ -z "$APPLIANCE_HOME" ]
then
    source ${APPLIANCE HOME}/admin_common.sh
else
    echo "ERROR: APPLIANCE HOME not set; cannot find admin_common.sh."
    exit -1
fi
#Construct the common set of environment variables used by
#all appliance-specific startup scripts.
function build_exports ( )
{
    #Double check that we have our environment variables from
    #the bootstrap
    if [ -z "$ENV_NAME" ] || [ -z "$SOFTWARE VERSION" ]] || [ -z
"$DOMAIN SUFFIX" ] \
    || [ -z "$APP_ARTIFACTS" ] || [ -z "$CLASS NAME" ] || [ -z
"$APPLIANCE HOME" ]
```

```
        then
            log_error "Missing required environment variables from
bootstrap. I cannot continue"
        fi
        #Set up derived environment variables
        TOMCAT_HOME="/usr/saas/tomcat"; export TOMCAT_HOME
        ARTIFACTS HOME=${APP ARTIFACTS}; export ARTIFACTS HOME
        LOGGING_HOME="UNINITIALIZED"
        DOS_LOGGING_HOME="NOT_SET_OR_NOT_CYGWIN"
        setupLoggingHome
        if [[ 0 != $? ]]
        then
            log_error "Failed to configure logging mount point."
        fi
        export LOGGING_HOME_DOS_LOGGING_HOME
        #function call to system log creation
        setupCustomSysLogOnLogVol
if [[ 0 != $? ]]
then
    log_error "Failed to configure system logs."
fi
        JAVA HOME="/usr/java"; export JAVA HOME
        TLD=${ENV_NAME}.${DOMAIN_SUFFIX}; export TLD
        export DISPATCHER_SERVER="api.${TLD}"
            export DISPATCHER_UNSECURE_SERVER="uapi.${TLD}"
        export AIM_SERVER="aim.${TLD}"
        export LIFERAY_SERVER="sec.${TLD}"
        export LIFERAY_UNSECURE_SERVER="usec.${TLD}"
        exoprt LIFERAY_UNSECURE_PORT="8080"
        export LIFERAY_UNSECURE_PROTOCOL="http"
        export CHAT_SERVER="DEPRECATED"
        ####################################################################
        # behavioral change -- we will not fail out on DNS lookup failures
        ####################################################################
        #Set AJAX_DOMAIN
        AJAX_DOMAIN=${DOMAIN_SUFFIX}
        export AJAX_DOMAIN
        # DNS MX Record
        MAIL SERVER=" "
        DIG=" "
        if [[ uname -o == "GNU/Linux" ]]
        then
            if [ -e "/usr/bin/dig" ]
            then
                DIG="/usr/bin/dig"
            elif [ -e "/bin/dig" ]
            then
                DIG="/bin/dig"
            elif which dig
            then
                DIG=$( which dig )
            else
                log info "Warning: Cannot locate program \'DIG\',
which is required for resolving the mail server. MAIL_SERVER will be set to
UNDEFINED"
            fi
        fi
        if [[ uname -o == "Cygwin" ]]
        then
            if [ -e "/usr/local/bin/dig.sh" ]
            then
                DIG="/usr/local/bin/dig.sh"
            elif which dig
            then
                DIG=$( which dig )
            else
                log_info "Warning: Cannot locate program \'DIG\',
which is required for resolving the mail server. MAIL_SERVER will be set to
UNDEFINED"
            fi
        fi
        if [ -z "$DIG" ]
        then
            MAIL_SERVER="UNDEFINED"
        else
            mxdomain="admin.${DOMAIN SUFFIX}"
            mail_ip=" "
            mail_fqdn=" "
```

```
        mail_fqdn=$( $DIG $mxdomain MX +short | head -1 )
        # See if we got an IP yet -- probably not
        if [[ $mail_fqdn =~ ^[[:digit:]]+\..[[:digit:]] ]]
        then
            mail_ip=$mail_fqdn
        else
            # Note that we always take the last
address. We are also ignoring
            # the fact that the MX record begins with a
number (the server weight)
            # Dig silently ignores this, thank goodness
            mail_ip=$( $DIG $mail_fqdn +short | tail -1
)
        fi
        # Make sure that the IP is an IP (note that we are
being really lazy here)
        if [[ $mail_ip =~ [[:digit:]]+\..[[:digit:]] ]]
        then
            MAIL_SERVER=${mail_ip}
        else
            #If it's not an IP, then make sure to
remove any trailing '.' characters
            MAIL_SERVER=$( echo "$mail_fqdn" |sed
's/ \.$//g' )
        fi
    fi
    if [ -z "$MAIL_SERVER" ]
    then
        log_info "Cannot resolve mail server for domain
admin.${DOMAIN_SUFFIX}; MAIL_SERVER will be set to UNDEFINED"
    fi
    log_info "Using MAIL_SERVER=${MAIL_SERVER}"
    export MAIL_SERVER
    #Handle LDAP-specific Stuff iff _HasLdap = yes (case insensitive)
    #TODO: presently, these are set via the constructor/applogic; maybe
they
    #should come from DNS? hmm. Probably not.
    [[ `uname -o` == "GNU/Linux" ]] && source /etc/applogic.sh
    [[ `uname -o` == "Cygwin" ]] && source /var/run/applogic/appliance.sh
    if ! [ -z "$_LdapEnabled" ] && [[ $_LdapEnabled =~ ^[tT][rR][uU][eE]
]]
    then
        export LDAP_ENABLED="true"
    else
        export LDAP_ENABLED="false"
    fi
    if [[ "$LDAP_ENABLED" =~ ^[tT][rR][uU][eE] ]]
    then
LDAP_PORT=19389
LDAP_HOST=${_LdapHost-"UNSET"}
LDAP_BASE_PROVIDER_URL="ldap://${LDAP_HOST}:${LDAP_PORT}"
LDAP_AUTH_ENABLED=true
LDAP_AUTH_REQUIRED=true
LDAP_IMPORT_ENABLED=false
LDAP_BASE_DN="o=vds"
LDAP_SECURITY_PRINCIPAL="cn=admin,ou=hub,o=vds"
LDAP_USERS_DN="ou=hub,o=vds"
# Escape special chars like $,: in _LdapSecurityCredentials, before
assigning it to LDAP_SECURITY_CREDENTIALS
tmpVar=$(echo "$_LdapSecurityCredentials" | sed -r -e
"s/([\/\\\:\$]|\[|\])/\\\\1/g")
        LDAP_SECURITY_CREDENTIALS=${tmpVar:-"UNSET"}
        export LDAP_HOST LDAP_PORT LDAP_BASE_PROVIDER_URL
LDAP_USERS_DN LDAP_AUTH_ENABLED \
LDAP_AUTH_REQUIRED
LDAP_IMPORT_ENABLED LDAP_BASE_DN \
LDAP_SECURITY_PRINCIPAL
LDAP_SECURITY_CREDENTIALS
    fi
    if [ -e ${APPLIANCE_HOME}/appliance_properties.sh ]
    then
        rm ${APPLIANCE_HOME}/appliance_properties.sh
    fi
    APPLIANCE_PROPERTIES="${APPLIANCE_HOME}/appliance_properties.sh"
    export APPLIANCE_PROPERTIES
}
```

-continued

```
function write_appliance_properties( )
{
################################################################################

    # Build appliance_properties.sh script for consumption by application
    # scripts.
################################################################################

    echo "
    ########################################################
    # Auto-generated appliance_properties.sh
    # Generated:  date +%Y%M%d_%H%M%S
    ########################################################
    " >${APPLIANCE_PROPERTIES}
    for f in ENV_NAME SOFTWARE_VERSION DOMAIN_SUFFIX \
        APP_ARTIFACTS NATIVE_ARTIFACTS CLASS_NAME APPLIANCE_HOME \
        TOMCAT_HOME ARTIFACTS_HOME LOGGING_HOME DOS_LOGGING_HOME \
        JAVA_HOME DISPATCHER_SERVER AIM_SERVER\
        LIFERAY_SERVER CHAT_SERVER AJAX_DOMAIN MAIL_SERVER
APPLIANCE_PROPERTIES \
        LDAP_ENABLED LDAP_HOST LDAP_PORT LDAP_USERS_DN
LDAP_BASE_PROVIDER_URL LDAP_AUTH_ENABLED \
        LDAP_AUTH_REQUIRED LDAP_IMPORT_ENABLED LDAP_BASE_DN \
        LDAP_SECURITY_PRINCIPAL LDAP_SECURITY_CREDENTIALS
${ALL_COMMON_VAR_NAMES}
    do
        #eval 'value=\$$f'
        #TODO: the second ${f}is not right. Fix this.
        #echo "export ${f}=$value" >> ${APPLIANCE_PROPERTIES}
        echo "export ${f}=\"${!f}\"" >> ${APPLIANCE_PROPERTIES}
    done
    echo "#EOF" >> ${APPLIANCE_PROPERTIES}
    log_info Generated appliance_properties.sh
}
################################################################################

# BEGIN MAIN

################################################################################

#set up environment
build_exports
#Export non-contract common variables
init_other_params
#Build properties file
#This dumps the file to ${APPLIANCE_HOME}
write_appliance_properties
#check for appliance_local.sh
#Note: this is not done in bootstrap to allow for future felxibility
#deterimine if NATIVE_ARTIFACTS is defined.
#if not set it to other possible values
#-SteveD 10/6/2011
if [ -z ${NATIVE ARTIFACTS} ]
then
    if [ -d ${APPLIANCE_HOME}/native ]
    then
        NATIVE_ARTIFACTS="${APPLIANCE_HOME}/native"
    else
        NATIVE_ARTIFACTS="${APPLIANCE_HOME}"
    fi
fi
#Components may bake in appliance_native.sh, which
#we will call if it exists
if [ -e ${NATIVE_ARTIFACTS}/appliance native.sh ]
then
    log_info "Invoking appliance_native.sh"
    ${NATIVE_ARTIFACTS}/appliance native.sh $@
    if [[ $? != 0 ]]
    then
        log_error "appliance_native failed to $@"
    else
        log_info "appliance_native $@ successful"
    fi
fi
#Skip appliance_local business SoftwareVersion is "NONE" -- for development
#purposes or non-configurable components only.
```

-continued

```
if [ ${SOFTWARE_VERSION} = "NONE" ]
then
    log_info "Software version is NONE; nothing more to do."
    exit 0
fi
#If there are no application-specific artifacts,
#the directory ${APP_ARTIFACTS} will not get created by the bootstrap.

#If this directory does exist, then it MUST contain appliance_local.sh
if [ -d ${APP_ARTIFACTS} ]
then
    cd ${APP_ARTIFACTS}
    if ! [ -e "appliance_local.sh" ]
    then
        log_error "Cannot locate appliance_local.sh.
Startup cannot proceed."
    fi
else
    log_info "Detected appliance without application-specific
tasks. Nothing further to do."
    exit 0
fi
# Ensure that known text files have been stripped of evil \r characters
find ${APP_ARTIFACTS} -name \*.txt -o -name \*.sh -o -name \*.sql | xargs
dos2unix
vme id=log severity=info progress=20 msg=" appliance_info Beginning
application start sequence"
#Note: it is assumed that the application script handles any possible timing
#issues before returning.

#Also, part of the contract is that the script returns zero on success and
#non-zero on failure.
log_info "$0 $1 called"
# Set up appliance log to capture output from the appliance_local's startup
appliance_log=${LOGGING_HOME}/appliance_sh.log
if ! [ -e ${appliance_log} ]
then
    touch ${appliance_log}
else
    for i in 2 1 0
    do
        if [ -e ${appliance_log}.$i ]
        then
mv ${appliance_log}.$i ${appliance_log}.$(( i + 1 ))
        fi
    done
    mv ${appliance_log} ${appliance_log}.0
    touch ${appliance_log}
fi
#Main dispatch
#Here we invoke the appliance-specific startup script to perform startup
#and shutdown commands
case $1 in
    start )
    {
        #TODO: any other stuff for me to do?
        #TODO remove subshells -- hiding errors
        >> ${appliance_log} ${APP_ARTIFACTS}/appliance_local.sh
configure || log_error "appliance_local.sh configure failed"
        vme id=log severity=info progress=50 msg=" appliance_info
Appliance Configuration Complete"
        >> ${appliance_log} ${APP_ARTIFACTS}/appliance_local.sh init
|| log_error "appliance_local.sh init failed"
        vme id=log severity=info progress=60 msg=" appliance_info
Appliance Initialization Complete"
        >> ${appliance_log} ${APP_ARTIFACTS}/appliance_local.sh start
|| log_error "appliance_local.sh start failed"
        vme id=log severity=info progress=100 msg=" appliance_info
Appliance Startup complete."
    }
    ;;
    stop)
    {
```

```
        #No need to run configure here
            >> ${appliance_log} ${APP_ARTIFACTS}/appliance_local.sh stop
|| log error "appliance_local.sh stop failed"
            log_info "$0 $1 complete"
        #TODO: Tear down logging to NFS or the system will hang on
shutdown.
        #function call to system log creation
revertCustomSysLogOnLogVol
        if [[ 0 != $? ]]
        then
            log_error "Failed to revert custom system logs."
        fi
    }
    ;;
    restart)
    {
        #Note: No initialize here!
        #we also assume that the appliance adequately cleans up after
itself
            >> ${appliance_log} ${APP_ARTIFACTS}/appliance_local.sh stop
|| log_error "appliance_local.sh stop failed""
            >> ${appliance_log} ${APP_ARTIFACTS}/appliance_local.sh
configure || log_error "appliance_local.sh configure failed"
            >> ${appliance_log} ${APP ARTIFACTS}/appliance_local.sh start
|| log error "appliance_local.sh start failed"
            log_info "$0 $1 complete"
    }
    ;;
    *)
        log_error "Error: invalid parameter $1 to script $0"
    ;;
esac
#Must return status to caller!
exit 0
#EOF
```

Later, a second startup script is invoked. This script is responsible for performing any configuration or initialization specific to this appliance. The details of such operations are automated in a third script. For example, on the load balancer appliance configures the load balancing software during this part of startup. When the startup is complete, a signal is sent to the execution container indicating successful or failed startup.

An example of the second script is shown below:

```
#!/bin/bash
########################################################################

#  Wall server appliance_local.sh script

#  CA Technologies Confidential and Proprietary.
Copyright (c) 2011, 2012 by CA Technologies. All Rights Reserved.
########################################################################

#warname="WallService"
warname="WALL"
#Source the properties file
source ${APPLIANCE_HOME}/admin_common.sh
source ${APPLIANCE_PROPERTIES:-/appliance/appliance_properties.sh}
#export JAVA_HOME="/usr/java"
JAVA_HOME=${JAVA_HOME:-/usr/java}
export JAVA_HOME
export PATH=$PATH:${JAVA_HOME}/bin
export app_instance_name=" "
extractfolder="${ARTIFACTS_HOME}/${warname}"
#Read the option passed to the script
option="$1"
export BACKUP_AGENT_PLUGIN="${ARTIFACTS_HOME}/wall-backup-restore-plugin.jar"
#CONFIGURE
if [[ "$option" =~ "config" ]]
then
        log_info "$@: Stop tomcat, copy the token-replaced directory under
artifacts to webapps and start tomcat"
        sh $TOMCAT_HOME/bin/catalina.sh stop 2>&1 > /dev/null
        log_info "$@: Configuring.."
        # Creating the truncate_only.txt so that the logs are not deleted
```

```
    # after they become zero length
        createTruncateOnlyFile ${LOGGING_HOME}/ wall.log backup-agent.log
backup_agent_requests.log
    #
    # Set up liferay and dispatcher props
    # Function (in admin_common.sh) does error logging, caller just need to
handle return code
    #
    setup_liferay_dispatcher_props
    if [ $? -ne 0 ]
    then
        exit 1
    fi
        #Make directory and unzip the war
        mkdir -p ${extractfolder}
        unzip $ARTIFACTS_HOME/$warname.war -d ${extractfolder}
#This code is where environment variables containing boundary information
#are propigated into configuration files within the application
#The resulting files are staged for runtime
        #Read token_info file and replace tokens on the given files
        old_ifs="${IFS}"
        while read line;
        do
                if [ -z "$line" ]
                then
                        continue
                fi
                IFS=";"
                set -- $line
                filepath=$1
                tokenname=$2
                envvarname=$3
                envvarvalue=${!envvarname}
                envvarvalue=$(echo $envvarvalue | sed -r -e
"s/([\/\\:]|\[|\])/\\\\1/g")
                sedreplacementstring=s/@$tokenname@/$envvarvalue/g
                fullpath=${extractfolder}/${filepath}
                log_info "$@: Replacing @$tokenname@ in file $fullpath"
                sed -i $sedreplacementstring $fullpath
        done < token_info.txt
        IFS="${old_ifs}"
        #---------------------------------------------------------------
        # Add SyslogAppender to log4j.properties for rsyslog SNMP traps
        #---------------------------------------------------------------
        LOG4J="${extractfolder}/'grep log4j token_info.txt|head -1|awk -F,
'{print $1}'"
        #Provide access rights to edit the properties file
        chmod 755 "${LOG4J}"
        sed "s:\(log4j.rootLogger=[A-Za-z, ][A-Za-z, ]*\):\1, SYSLOG_LOCAL1:" -i
${LOG4J}
        echo " "
>> ${LOG4J}
        echo " "
>> ${LOG4J}
        echo "#---------------------------------------------------------------
----------" >> ${LOG4J}
        echo "# Added for rsyslog SNMP traps"
>> ${LOG4J}
        echo "#---------------------------------------------------------------
----------" >> ${LOG4J}
        echo " "
>> ${LOG4J}
        echo "log4j.appender.SYSLOG_LOCAL1=org.apache.log4j.net.SyslogAppender"
>> ${LOG4J}
        echo "log4j.appender.SYSLOG_LOCAL1.threshold=ERROR"
>> ${LOG4J}
        echo "log4j.appender.SYSLOG_LOCAL1.syslogHost=localhost"
>> ${LOG4J}
        echo "log4j.appender.SYSLOG_LOCAL1.facility=LOCAL1"
>> ${LOG4J}
        echo "log4j.appender.SYSLOG_LOCAL1.facilityPrinting=false"
>> ${LOG4J}
    echo
"log4j.appender.SYSLOG_LOCAL1.layout=org.apache.log4j.PatternLayout"
>> ${LOG4J}
        echo "log4j.appender.SYSLOG_LOCAL1.layout.conversionPattern=[%p] %c:%L -
%m%n"         >> ${LOG4J}
```

```
        log_info "$@: Added SyslogAppender properties to ${LOG4J}"
        #Modify backup.properties file with the appliance WALL agent values
        AGENT_FACTORY_CLASS="com.ca.saas.wall.backupagent.WallBackupAgentPlugin
Factory"
        APPLIANCE_CLASS_NAME=$app_instance_name
        MOUNT_BASE="/mnt"
        update_backup_properties "${AGENT_FACTORY_CLASS}" "${MOUNT_BASE}"
"${APPLIANCE_CLASS_NAME}"
        if [[ $? != 0 ]]
        then
                log_app_error "Could not replace property values in
backup.properties file for WALL appliance "
                exit -1
        fi
        log_info "$@: remove war"
        rm -rf $TOMCAT_HOME/webapps/$warname
        log_info "$@: move new war"
        mv $extractfolder $TOMCAT_HOME/webapps/
        exit 0
fi
#START
if [ "$option" == "start" ]
then
        log_info "$@: start catalina"
        sh $TOMCAT_HOME/bin/catalina.sh start
        # Starting backup agent
        start_backup_agent "${BACKUP_AGENT_PLUGIN}"
        exit $?
fi
#STOP
if [ "$option" == "stop" ]
then
        log_info "$@ Stopping Catalina"
        /usr/saas/tomcat/bin/catalina.sh stop
        exit $?
fi
#INIT
if [ "$option" == "init" ]
then
        # Running the automated upgrader
        persistent_object="ITMaaS Wall Service Schema"
        perform_upgrade "${persistent_object}" wall-persistence-helper-
plugin.jar com.ca.saas.wall.persistencehelper.WallUpgraderPlugin
/usr/saas/tomcat/webapps/WALL/WEB-INF/classes/META-
INF/spring/database.properties ${ARTIFACTS_HOME}/db_scripts
/usr/saas/tomcat/webapps/WALL/WEB-INF/classes/META-INF/spring/version-
descriptor.xml false
        rc=$?
        if [[ ${rc} == 0 ]]
        then
                log_info "$@: Upgrade Process Successful for
${persistent_object}."
        elif [[ ${rc} == 2 ]]
        then
                log_info "$@: The class provided is not an instance of
${Persistent_object}. Could not initialize the plugin with the parameters
specified. "
                exit ${rc}
        elif [[ ${rc} == 3 ]]
        then
                log_info "$@: Encountered class mismatch for ${persistent_object}
plugin implementation class. Could not initialize the plugin with the
parameters specified for upgrading ${persistent_object}. "
                exit ${rc}
        elif [[ ${rc} == 4 ]]
        then
                log_app_error "$@: Problem occured in Upgrade Process. Upgrade
Failed for ${persistent_object}.Please check logs. "
                exit ${rc}
        elif [[ ${rc} == 5 ]]
        then
                log_app_error "$@: Problem occured in Upgrade Process of
${persostent_object}. Ondisk version is greater than current version.
Downgrade is not supported for ${persistent_object}."
                exit ${rc}
        elif [[ ${rc} == 6 ]]
```

-continued

```
        then
                log_info "$@: Ondisk version and current version are same , no
upgrade is required for ${persistent_object}."
            elif [[ ${rc} == 7 ]]
            then
                log_app_error "$@: Unable to update schema_info table post upgrade.
${persistent_object} upgrade has failed. "
            elif [[ ${rc} == 8 ]]
            then
                log_info "$@: ${persistent_object} has succesfully seeded. "
            elif [[ ${rc} == 9 ]]
            then
                log_info "$@: Detected the presence of a row in schema_info other
than ${persistent_object} "
                        exit ${rc}
            else
                log_app_error "$@: Problem occured in Upgrade Process of
${persistent_object}."
                        exit ${rc}
            fi
            exit 0
fi
log_app_error "$@: Unrecognized or invalid option $option; must be one of {
start, stop, init, config }"
exit -1
```

In further embodiments, additional logic may be added into the bootstrap process which provides a uniform pattern for implementing application-specific actions during startup. A set of common components can be used and each application can implement a series of call-backs that are invoked by the bootstrap. This standardized process eliminates the need for each appliance developer to invent his own startup mechanisms and also guarantees a predictable, repeatable startup sequence for all conformant appliances. The process inherently incorporates means to satisfy license restrictions on distribution, as necessary, as well as alternatives to enhance control over access to proprietary executables and/or user data.

For instance, the bootstrap process is performed as usual. The same second script is invoked. However, the platform now reconfigures it to invoke a fourth bootstrap script in place of where it would usually invoke the second bootstrap script. The fourth script is therefore invoked. It copies proprietary files from a separate read-only location into a runtime staging directory. All files that require configuration changes prior to application startup may be in this location. This insures that the application source files are in a known state, and can be fully separated if needed for licensing purposes. In development, this step can be made more flexible. Instead of copying from a configuration-controlled, read-only source, new executables can be downloaded from build servers to fully automate the development to execution container deployment process.

Continuing with our example embodiment, all logs on the appliance are then diverted to a common NFS mounted logger volume, which may be automated. System and application logs are systematically redirected to the log mount point. The script now performs the following: it ensures environment variables are exported for use in configuration, it includes environment-specific host names for accessing shared external services, it runs the configure, setupPersistence, and start procedures as defined by the appliance-specific "appliance local.sh" script. The configure operation modifies file contents appropriate to the application context. The "setupPersistence" operation initializes files and tables used for persistence. For example, if the database is empty, this step would seed the data. Or, if the bootstrap detects that an upgrade is being performed, it applies any needed data changes to conform to the new version. This is the point in the startup sequence where the appliance first touches its user data volume(s) and may determine what action(s), if any, to take to prepare its user data volumes for runtime. The "start" operation begins the execution of the application.

Figure 7:
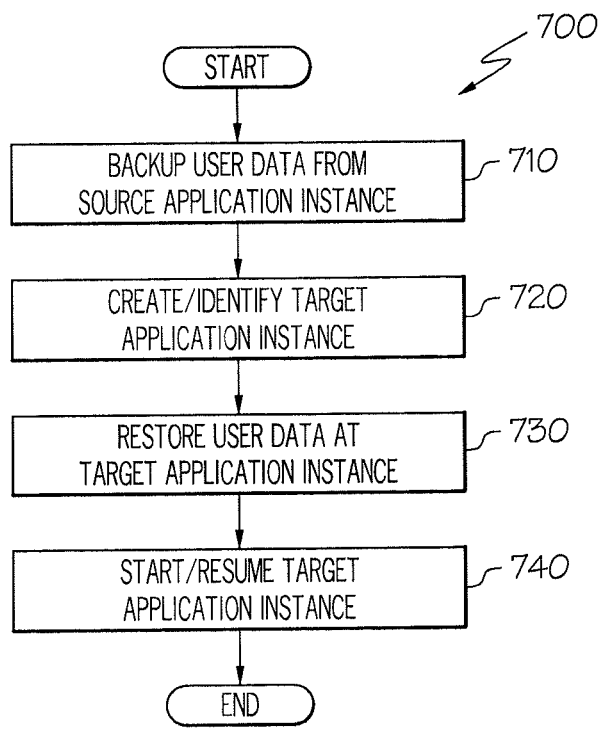
FIG. 7 illustrates an example method for application recovery or migration.

FIG. 7 illustrates an example method for application instance recovery/migration according to particular embodiments of the present disclosure. One of skill in the art will note that the steps of method 700 can be performed for either a recovery or migration of an application instance (which may be local or remote).

The method begins at step 710, where the source application instance's user data is backed up. In some embodiments, such backup may be performed by directly duplicating the application's user data volumes; depending on the execution container, such volume duplication may necessitate the temporary shutdown or suspension of the application. In some embodiments, such backup may be performed by instructing the running application, via the Platform API, to back up its data to some location; in such embodiments, the application typically performs a backup without needing to shut down. Applications may also be designed such that, additionally, no application downtime or service interruption is incurred due to the backup taking place.

Next, at step 720, which may follow immediately from step 710 or may occur sometime in the future, a target application instance is selected or created. In some embodiments, instance identification or creation is performed by the infrastructure management service 150. Note that, depending on the reason for restoring or transferring the data, the location of the target instance could be local (with respect to the source) or remote. In some embodiments, backups may regularly be replicated to remote data centers to enable disaster recovery or other forms of increased availability. In some embodiments, backups may be transferred between execution containers, for example, to relocate an application instance to a container with more free resources.

At step 730, the data backed up in step 710 is restored to the target instance of step 720. In some embodiments, volume backups may be attached to or mounted by the target instance.

In other embodiments, the target instance may be started and instructed to restore data from a particular backup. In yet other embodiments, the target instance may already be running and contain user data and may be instructed to restore the backup by effectively importing the backed-up data into the running system—preserving existing user data. If the data backed up in 710 is for a particular tenant and this particular embodiment is used, the net effect is the migration or transfer of the given tenant from the source instance to the destination instance.

Finally, at step 740, if needed, the target instance is started up, restarted, or resumed. In embodiments where the restore procedure is performed online by a running application, it may be the case that nothing whatever is done at step 740. In other embodiments, restoring to a running application may require that the application be paused or the application services briefly shut down, for example, to ensure consistency when importing data. In still other embodiments, such as when duplicate volumes are attached to a new target instance, the application instance will be in a powered-off state and require full startup.

Figure 8:
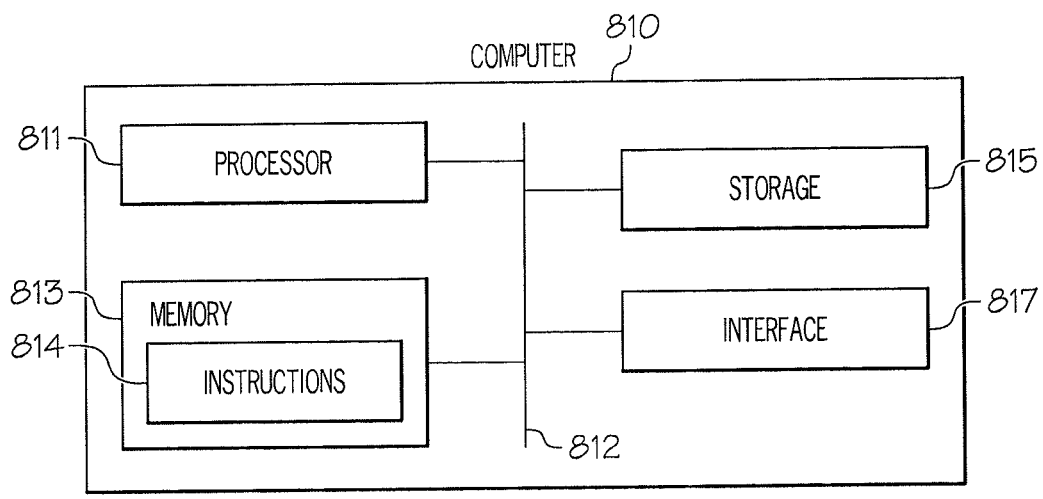
FIG. 8 illustrates an example computer system suitable for implementing one or more portions of the present disclosure.

FIG. 8 illustrates an example architecture of a computer 810 according to particular embodiments of the present disclosure. For instance, in particular embodiments, one or more computers 810 may be included in hardware 140 of FIG. 1. Each computer 810 may include its own respective processor 811, memory 813, instructions 814, storage 815, interface 817, and bus 812. These components may work together to perform one or more steps of one or more methods and provide the functionality described herein. For example, in particular embodiments, instructions 814 in memory 813 may be executed on processor 811 in order to perform one or more methods (e.g. the methods of FIGS. 5-7) using data received by and/or through interface 817. In certain embodiments, instructions 814 may reside in storage 815 instead of, or in addition to, memory 813.

Processor 811 may be a microprocessor, controller, application specific integrated circuit (ASIC), or any other suitable computing device operable to provide, either alone or in conjunction with other components (e.g., memory 813 and instructions 814) IT infrastructure monitoring functionality. Such functionality may include providing a ranking of the most troublesome or unreliable components of an IT infrastructure, as discussed herein. In particular embodiments, processor 811 may include hardware for executing instructions 814, such as those making up a computer program or application. As an example and not by way of limitation, to execute instructions 814, processor 811 may retrieve (or fetch) instructions 814 from an internal register, an internal cache, memory 813 or storage 815; decode and execute them; and then write one or more results to an internal register, an internal cache, memory 813, or storage 815.

Memory 813 may be any form of volatile or non-volatile memory including, without limitation, magnetic media, optical media, random access memory (RAM), read-only memory (ROM), flash memory, removable media, or any other suitable local or remote memory component or components. Memory 813 may store any suitable data or information utilized by computer 810, including software (e.g., instructions 814) embedded in a computer readable medium, and/or encoded logic incorporated in hardware or otherwise stored (e.g., firmware). In particular embodiments, memory 813 may include main memory for storing instructions 814 for processor 811 to execute or data for processor 811 to operate on. In particular embodiments, one or more memory management units (MMUs) may reside between processor 811 and memory 813 and facilitate accesses to memory 813 requested by processor 811.

Storage 815 may include mass storage for data or instructions (e.g., instructions 814). As an example and not by way of limitation, storage 815 may include a hard disk drive (HDD), a floppy disk drive, flash memory, an optical disc, a magneto-optical disc, magnetic tape, a Universal Serial Bus (USB) drive, a combination of two or more of these, or any suitable computer readable medium. Storage 815 may include removable or non-removable (or fixed) media, where appropriate. Storage 815 may be internal or external to computer 810 (and/or remote transceiver 220), where appropriate. In some embodiments, instructions 814 may be encoded in storage 815 in addition to, in lieu of, memory 813.

Interface 817 may include hardware, encoded software, or both providing one or more interfaces for communication (such as, for example, packet-based communication) between computer 810 and any other computer systems on network 110. As an example, and not by way of limitation, interface 817 may include a network interface controller (NIC) or network adapter for communicating with an Ethernet or other wire-based network and/or a wireless NIC (WNIC) or wireless adapter for communicating with a wireless network. Interface 817 may include one or more connectors for communicating traffic (e.g., IP packets) via a bridge card. Depending on the embodiment, interface 817 may be any type of interface suitable for any type of network in which computer 810 is used. In some embodiments, interface 817 may include one or more interfaces for one or more I/O devices. One or more of these I/O devices may enable communication between a person and computer 810. As an example, and not by way of limitation, an I/O device may include a keyboard, keypad, microphone, monitor, mouse, printer, scanner, speaker, still camera, stylus, tablet, touch-screen, trackball, video camera, another suitable I/O device or a combination of two or more of these.

Bus 812 may include any combination of hardware, software embedded in a computer readable medium, and/or encoded logic incorporated in hardware or otherwise stored (e.g., firmware) to couple components of computer 810 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 812 may include any number, type, and/or configuration of buses 812, where appropriate. In particular embodiments, one or more buses 812 (which may each include an address bus and a data bus) may couple processor 811 to memory 813. Bus 812 may include one or more memory buses.

In addition to hardware virtualization (e.g., VMware or Xen), other technologies such as network virtualization, software-defined networks, and various forms of storage virtualization presently exist and other embodiments of the same are in development. One of ordinary skill in the art will appreciate that infrastructure and resources traditionally facilitated by, for example, wired networks and/or disk arrays can just as easily be facilitated by virtualized versions of the same. Thus, embodiments of the present disclosure utilizing virtualized resources or infrastructure not explicitly discussed herein are still consistent with aspects of the present disclosure.

The flowcharts and block diagrams in FIGS. 1-8 illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A system comprising:
   at least one non-transitory computer readable storage medium comprising:
      first appliance information;
      second appliance information, the second appliance information different from the first appliance information; and
      first application information comprising:
         information for generating a first appliance based on the first appliance information;
         information for generating a second appliance based on the second appliance information;
         information for configuring communication between the first appliance and the second appliance;
         a first identifier associated with a third volume; and
         a second identifier associated with a fourth volume;
   at least one processor configured to:
      generate a first volume using the first application information and a first set of parameters, wherein generating the first volume comprises copying the first appliance information into the first volume, the first set of parameters associated with an environment in which the first volume is situated;
      generate a second volume using the second application information and a second set of parameters, wherein generating the second volume comprises copying the second appliance information into the second volume, the second set of parameters associated with an environment in which the second volume is situated;
      initiate a first appliance instance by executing code from the first volume using information in the third volume, the third volume configured to store user information, the third volume stored separately from the first volume and the second volume; and
      initiate a second appliance instance by executing code in the second volume using information in a fourth volume, the fourth volume configured to store user information, the fourth volume stored separately from the first volume, the second volume, and the third volume.

2. The system of claim 1, wherein the at least one processor initiating the first appliance instance comprises:
   detecting, using the first identifier, that the third volume does not exist; and
   generating the third volume in response to determining that the third volume does not exist.

3. The system of claim 1, wherein the at least one processor is further configured to store, in the third volume, user information generated in response to executing the code in the first volume and wherein the user information comprises tenant data related to tenant's resource assignments.

4. The system of claim 1, wherein the at least one processor is further configured to:
   generate a fifth volume using the first application information and a third set of parameters, wherein generating the fifth volume comprises copying the first appliance information into the fifth volume, the third set of parameters associated with an environment in which the fifth volume is situated, the fifth volume stored separately from the first volume, the second volume, the third volume, and the fourth volume;
   generate a sixth volume using the second application information and a fourth set of parameters, wherein generating the sixth volume comprises copying the second appliance information into the sixth volume, the fourth set of parameters associated with an environment in which the sixth volume is situated, the sixth volume stored separately from the first volume, the second volume, the third volume, the fourth volume, and the fifth volume;
   initiate a third appliance instance by executing code from the fifth volume using information in a seventh volume, the seventh volume configured to store user information, the seventh volume stored separately from the first volume, the second volume, the third volume, the fourth volume, the fifth volume, and the sixth volume; and
   initiate a fourth appliance instance by executing code in the fifth volume using information in an eighth volume, the eighth volume configured to store user information, the eighth volume stored separately from the first volume, the second volume, the third volume, the fourth volume, the fifth volume, the sixth volume, and the seventh volume;

wherein the first appliance instance and the second appliance instance are associated with a first application instance; and wherein the third appliance instance and the fourth appliance instance are associated with a second application instance.

5. The system of claim 1, wherein the at least one processor is further configured to:

generate a fifth volume using the first application information and a third set of parameters, wherein generating the fifth volume comprises copying the first appliance information into the fifth volume, the third set of parameters associated with an environment in which the fifth volume is situated, the fifth volume stored separately from the first volume, the second volume, the third volume, and the fourth volume;

generate a sixth volume using the second application information and a fourth set of parameters, wherein generating the sixth volume comprises copying the second appliance information into the sixth volume, the fourth set of parameters associated with an environment in which the sixth volume is situated, the sixth volume stored separately from the first volume, the second volume, the third volume, the fourth volume, and the fifth volume;

generate a seventh volume using the first appliance information, wherein the seventh volume comprises copy of the third volume, the seventh volume stored separately from the first volume, the second volume, the third volume, the fourth volume, the fifth volume, and the sixth volume;

generate an eighth volume using the second appliance information, wherein the eighth volume comprises a copy of the third volume, the eighth volume stored separately from the first volume, the second volume, the third volume, the fourth volume, the fifth volume, the sixth volume, and the seventh volume;

initiate a third appliance instance by executing code from the fifth volume using information in the seventh volume; and initiate a fourth appliance instance by executing code in the fifth volume using information in the eighth volume.

6. The system of claim 1, wherein the at least one processor is further configured to:

stop the first appliance instance;

modify the first appliance information;

modify, based on the first application information and the modified first appliance information, the first volume;

initiate the first appliance instance by executing code from the modified first volume using information in the third volume.

7. The system of claim 1, wherein:

the at least one non-transitory computer readable storage medium further comprises:

third appliance information, the third appliance information different from the first appliance information and the second appliance information; and second application information comprising:

the information for generating the first appliance based on the first appliance information;

information for generating a third appliance based on the third appliance information;

information for configuring communication between the first appliance and the third appliance;

a third identifier associated with a seventh volume; and a fourth identifier associated with an eighth volume;

the at least one processor is further configured to:

generate a fifth volume using the second application information and a third set of parameters, wherein generating the fifth volume comprises copying the first appliance information into the fifth volume, the third set of parameters associated with an environment in which the fifth volume is situated, the fifth volume stored separately from the first volume, the second volume, the third volume, and the fourth volume;

generate a sixth volume using the second application information and a fourth set of parameters, wherein generating the sixth volume comprises copying the third appliance information into the sixth volume, the fourth set of parameters associated with an environment in which the sixth volume is situated, the sixth volume stored separately from the first volume, the second volume, the third volume, the fourth volume, and the fifth volume;

initiate a third appliance instance by executing code from the fifth volume using information in the seventh volume, the seventh volume configured to store user information, the seventh volume stored separately from the first volume, the second volume, the third volume, the fourth volume, and the sixth volume; and initiate a fourth appliance instance by executing code in the fifth volume using information in the eighth volume, the eighth volume configured to store user information, the eighth volume stored separately from the first volume, the second volume, the third volume, the fourth volume, the sixth volume, and the seventh volume.

8. A method executed by at least one processor, comprising:

accessing first application information, the first application information comprising:

information for generating a first appliance based on first appliance information;

information for generating a second appliance based on second appliance information different from the first appliance information;

information for configuring communication between the first appliance and the second appliance;

a first identifier associated with a third volume; and a second identifier associated with a fourth volume;

generating a first volume using the first application information and a first set of parameters, wherein generating the first volume comprises copying the first appliance information into the first volume, the first set of parameters associated with an environment in which the first volume is situated;

generating a second volume using the second application information and a second set of parameters, wherein generating the second volume comprises copying the second appliance information into the second volume, the second set of parameters associated with an environment in which the second volume is situated;

initiating a first appliance instance by executing code from the first volume using information in the third volume, the third volume configured to store user information, the third volume stored separately from the first volume and the second volume; and initiating a second appliance instance by executing code in the second volume using information in a fourth volume, the fourth volume configured to store user information, the fourth volume stored separately from the first volume, the second volume, and the third volume.

9. The method of claim 8, further comprising:
detecting, using the first identifier, that the third volume does not exist; and
generating the third volume in response to determining that the third volume does not exist.

10. The method of claim 8, further comprising storing, in the third volume, user information generated in response to executing the code in the first volume.

11. The method of claim 8, further comprising:
generating a fifth volume using the first application information and a third set of parameters, wherein generating the fifth volume comprises copying the first appliance information into the fifth volume, the third set of parameters associated with an environment in which the fifth volume is situated, the fifth volume stored separately from the first volume, the second volume, the third volume, and the fourth volume;
generating a sixth volume using the second application information and a fourth set of parameters, wherein generating the sixth volume comprises copying the second appliance information into the sixth volume, the fourth set of parameters associated with an environment in which the sixth volume is situated, the sixth volume stored separately from the first volume, the second volume, the third volume, the fourth volume, and the fifth volume;
initiating a third appliance instance by executing code from the fifth volume using information in a seventh volume, the seventh volume configured to store user information, the seventh volume stored separately from the first volume, the second volume, the third volume, the fourth volume, and the sixth volume; and
initiating a fourth appliance instance by executing code in the fifth volume using information in an eighth volume, the eighth volume configured to store user information, the eighth volume stored separately from the first volume, the second volume, the third volume, the fourth volume, the sixth volume, and the seventh volume;
wherein the first appliance instance and the second appliance instance are associated with a first application instance; and
wherein the third appliance instance and the fourth appliance instance are associated with a second application instance.

12. The method of claim 8, further comprising:
generating a fifth volume using the first application information and a third set of parameters, wherein generating the fifth volume comprises copying the first appliance information into the fifth volume, the third set of parameters associated with an environment in which the fifth volume is situated, the fifth volume stored separately from the first volume, the second volume, the third volume, and the fourth volume;
generating a sixth volume using the second application information and a fourth set of parameters, wherein generating the sixth volume comprises copying the second appliance information into the sixth volume, the fourth set of parameters associated with an environment in which the sixth volume is situated, the sixth volume stored separately from the first volume, the second volume, the third volume, the fourth volume, and the fifth volume;
generating a seventh volume using the first appliance information, wherein the seventh volume comprises copy of the third volume, the seventh volume stored separately from the first volume, the second volume, the third volume, the fourth volume, the fifth volume, and the sixth volume;
generating an eighth volume using the second appliance information, wherein the eighth volume comprises a copy of the third volume, the eighth volume stored separately from the first volume, the second volume, the third volume, the fourth volume, the fifth volume, the sixth volume, and the seventh volume;
initiating a third appliance instance by executing code from the fifth volume using information in the seventh volume; and
initiating a fourth appliance instance by executing code in the fifth volume using information in the eighth volume.

13. The method of claim 8, further comprising:
stopping the first appliance instance;
modifying the first appliance information;
modifying, based on the first application information and the modified first appliance information, the first volume;
initiating the first appliance instance by executing code from the modified first volume using information in the third volume.

14. The method of claim 8, further comprising:
accessing second application information, the second application comprising:
information for generating a first appliance based on first appliance information;
information for generating a third appliance based on third appliance information different from the first appliance information and second appliance information;
information for configuring communication between the first appliance and the third appliance;
a third identifier associated with a seventh volume; and
a fourth identifier associated with an eighth volume;
generating a fifth volume using the second application information and a third set of parameters, wherein generating the fifth volume comprises copying the first appliance information into the fifth volume, the third set of parameters associated with an environment in which the fifth volume is situated, the fifth volume stored separately from the first volume, the second volume, the third volume, and the fourth volume;
generating a sixth volume using the second application information and a fourth set of parameters, wherein generating the sixth volume comprises copying the third appliance information into the sixth volume, the fourth set of parameters associated with an environment in which the sixth volume is situated, the sixth volume stored separately from the first volume, the second volume, the third volume, the fourth volume, and the fifth volume;
initiating a third appliance instance by executing code from the fifth volume using information in the seventh volume, the seventh volume configured to store user information, the seventh volume stored separately from the first volume, the second volume, the third volume, the fourth volume, and the sixth volume; and
initiating a fourth appliance instance by executing code in the fifth volume using information in the eighth volume, the eighth volume configured to store user information, the eighth volume stored separately from the first volume, the second volume, the third volume, the fourth volume, the sixth volume, and the seventh volume.

15. A computer program product comprising:
- a non-transitory computer readable storage medium having computer readable program code embodied therewith, the computer readable program code comprising:
  - computer readable program code configured to access first application information, the first application information comprising:
    - information for generating a first appliance based on first appliance information;
    - information for generating a second appliance based on second appliance information different from the first appliance information;
    - information for configuring communication between the first appliance and the second appliance;
    - a first identifier associated with a third volume; and
    - a second identifier associated with a fourth volume;
  - computer readable program code configured to generate a first volume using the first application information and a first set of parameters, wherein generating the first volume comprises copying the first appliance information into the first volume, the first set of parameters associated with an environment in which the first volume is situated;
  - computer readable program code configured to generate a second volume using the second application information and a second set of parameters, wherein generating the second volume comprises copying the second appliance information into the second volume, the second set of parameters associated with an environment in which the second volume is situated;
  - computer readable program code configured to initiate a first appliance instance by executing code from the first volume using information in the third volume, the third volume configured to store user information, the third volume stored separately from the first volume and the second volume; and
  - computer readable program code configured to initiate a second appliance instance by executing code in the second volume using information in a fourth volume, the fourth volume configured to store user information, the fourth volume stored separately from the first volume, the second volume, and the third volume.

16. The computer program product of claim 15, further comprising:
- computer readable program code configured to detect, using the first identifier, that the third volume does not exist; and
- computer readable program code configured to generate the third volume in response to determining that the third volume does not exist.

17. The computer program product of claim 15, further comprising computer readable program code configured to store, in the third volume, user information generated in response to executing the code in the first volume.

18. The computer program product of claim 15, further comprising:
- computer readable program code configured to generate a fifth volume using the first application information and a third set of parameters, wherein generating the fifth volume comprises copying the first appliance information into the fifth volume, the third set of parameters associated with an environment in which the fifth volume is situated, the fifth volume stored separately from the first volume, the second volume, the third volume, and the fourth volume;
- computer readable program code configured to generate a sixth volume using the second application information and a fourth set of parameters, wherein generating the sixth volume comprises copying the second appliance information into the sixth volume, the fourth set of parameters associated with an environment in which the sixth volume is situated, the sixth volume stored separately from the first volume, the second volume, the third volume, the fourth volume, and the fifth volume;
- computer readable program code configured to initiate a third appliance instance by executing code from the fifth volume using information in a seventh volume, the seventh volume configured to store user information, the seventh volume stored separately from the first volume, the second volume, the third volume, the fourth volume, and the sixth volume; and
- computer readable program code configured to initiate a fourth appliance instance by executing code in the fifth volume using information in an eighth volume, the eighth volume configured to store user information, the eighth volume stored separately from the first volume, the second volume, the third volume, the fourth volume, the sixth volume, and the seventh volume;
- wherein the first appliance instance and the second appliance instance are associated with a first application instance; and
- wherein the third appliance instance and the fourth appliance instance are associated with a second application instance.

19. The computer program product of claim 15, further comprising:
- computer readable program code configured to generate a fifth volume using the first application information and a third set of parameters, wherein generating the fifth volume comprises copying the first appliance information into the fifth volume, the third set of parameters associated with an environment in which the fifth volume is situated, the fifth volume stored separately from the first volume, the second volume, the third volume, and the fourth volume;
- computer readable program code configured to generate a sixth volume using the second application information and a fourth set of parameters, wherein generating the sixth volume comprises copying the second appliance information into the sixth volume, the fourth set of parameters associated with an environment in which the sixth volume is situated, the sixth volume stored separately from the first volume, the second volume, the third volume, the fourth volume, and the fifth volume;
- computer readable program code configured to generate a seventh volume using the first appliance information, wherein the seventh volume comprises copy of the third volume, the seventh volume stored separately from the first volume, the second volume, the third volume, the fourth volume, the fifth volume, and the sixth volume;
- computer readable program code configured to generate an eighth volume using the second appliance information, wherein the eighth volume comprises a copy of the third volume, the eighth volume stored separately from the first volume, the second volume, the third volume, the fourth volume, the fifth volume, the sixth volume, and the seventh volume;
- computer readable program code configured to initiate a third appliance instance by executing code from the fifth volume using information in the seventh volume; and
- computer readable program code configured to initiate a fourth appliance instance by executing code in the fifth volume using information in the eighth volume.

20. The computer program product of claim 15, further comprising:
- computer readable program code configured to stop the first appliance instance;
- computer readable program code configured to modify the first appliance information;
- computer readable program code configured to modify, based on the first application information and the modified first appliance information, the first volume;
- computer readable program code configured to initiate the first appliance instance by executing code from the modified first volume using information in the third volume.

21. The computer program product of claim 15, further comprising:
- computer readable program code configured to access second application information, the second application comprising:
  - information for generating a first appliance based on first appliance information;
  - information for generating a third appliance based on third appliance information different from the first appliance information and second appliance information;
  - information for configuring communication between the first appliance and the third appliance;
  - a third identifier associated with a seventh volume; and
  - a fourth identifier associated with an eighth volume;
- computer readable program code configured to generate a fifth volume using the second application information and a third set of parameters, wherein generating the fifth volume comprises copying the first appliance information into the fifth volume, the third set of parameters associated with an environment in which the fifth volume is situated, the fifth volume stored separately from the first volume, the second volume, the third volume, and the fourth volume;
- computer readable program code configured to generate a sixth volume using the second application information and a fourth set of parameters, wherein generating the sixth volume comprises copying the third appliance information into the sixth volume, the fourth set of parameters associated with an environment in which the sixth volume is situated, the sixth volume stored separately from the first volume, the second volume, the third volume, the fourth volume, and the fifth volume;
- computer readable program code configured to initiate a third appliance instance by executing code from the fifth volume using information in the seventh volume, the seventh volume configured to store user information, the seventh volume stored separately from the first volume, the second volume, the third volume, the fourth volume, and the sixth volume; and
- computer readable program code configured to initiate a fourth appliance instance by executing code in the fifth volume using information in the eighth volume, the eighth volume configured to store user information, the eighth volume stored separately from the first volume, the second volume, the third volume, the fourth volume, the sixth volume, and the seventh volume.

* * * * *